(12) United States Patent
Ramalingam

(10) Patent No.: US 10,415,983 B2
(45) Date of Patent: Sep. 17, 2019

(54) SYSTEM AND METHOD FOR AUTOMATIC PASSENGER SHARING AMONG VEHICLES

(71) Applicant: SONY CORPORATION, Tokyo (JP)

(72) Inventor: Prabakaran Ramalingam, Bangalore (IN)

(73) Assignee: SONY CORPORATION, Tokyo (JP)

( * ) Notice: Subject to any disclaimer, the term of this patent is extended or adjusted under 35 U.S.C. 154(b) by 218 days.

(21) Appl. No.: 15/465,053

(22) Filed: Mar. 21, 2017

(65) Prior Publication Data

US 2018/0275648 A1    Sep. 27, 2018

(51) Int. Cl.
| | | |
|---|---|---|
| G01C 21/34 | (2006.01) | |
| G05D 1/00 | (2006.01) | |
| G05D 1/02 | (2006.01) | |
| H04L 29/08 | (2006.01) | |
| G01S 19/42 | (2010.01) | |

(52) U.S. Cl.
CPC ..... *G01C 21/3438* (2013.01); *G01C 21/3423* (2013.01); *G05D 1/0027* (2013.01); *G05D 1/0285* (2013.01); *H04L 67/12* (2013.01); *G01S 19/42* (2013.01); *G05D 1/0088* (2013.01)

(58) Field of Classification Search
CPC .. G05D 1/0027; G05D 1/0285; G05D 1/0088; G01C 21/3438; G01C 21/3423; H04L 67/12; G01S 19/42
See application file for complete search history.

(56) References Cited

U.S. PATENT DOCUMENTS

| | | | | |
|---|---|---|---|---|
| 9,679,489 B2* | 6/2017 | Lambert | ............... | G08G 1/123 |
| 9,978,282 B2* | 5/2018 | Lambert | ............... | G08G 1/123 |
| 10,147,325 B1* | 12/2018 | Copeland | ............. | G08G 1/202 |
| 2009/0248587 A1* | 10/2009 | Van Buskirk | .......... | G06Q 10/06 |
| | | | | 705/80 |
| 2013/0179205 A1* | 7/2013 | Slinin | ................... | G06Q 10/04 |
| | | | | 705/7.13 |
| 2014/0129135 A1* | 5/2014 | Holden | ................. | G01C 21/30 |
| | | | | 701/420 |
| 2014/0188775 A1* | 7/2014 | Lehmann | ........... | G01C 21/3438 |
| | | | | 706/46 |
| 2015/0241880 A1 | 8/2015 | Kim et al. | | |
| 2015/0254986 A1 | 9/2015 | Fairfield et al. | | |

(Continued)

FOREIGN PATENT DOCUMENTS

EP    2573720 A1    3/2013

*Primary Examiner* — Peter D Nolan
(74) *Attorney, Agent, or Firm* — Chip Law Group

(57) ABSTRACT

A system and method for sharing passengers among vehicles includes one or more circuits, in an electronic control unit (ECU) of a first vehicle in a plurality of vehicles, configured to communicate a vehicle sharing request including first seat mapping information and first route information associated with the first vehicle to at least one remaining vehicle of the plurality of vehicles. A second vehicle is identified among the at least one remaining vehicle for sharing passengers based on a comparison of the first route information and the first seat mapping information with second route information and second seat mapping information received from the at least one remaining vehicle. A target vehicle is selected from the second vehicle or the first vehicle to allow one or more first passengers of the first vehicle and one or more second passengers of the second vehicle to share travel in the target vehicle.

26 Claims, 13 Drawing Sheets

(56) References Cited

U.S. PATENT DOCUMENTS

| | | | |
|---|---|---|---|
| 2015/0324945 A1* | 11/2015 | Lord | G06Q 50/30 |
| | | | 705/7.13 |
| 2016/0334232 A1* | 11/2016 | Zhuang | G01C 21/3438 |
| 2017/0243492 A1* | 8/2017 | Lambert | G08G 1/123 |
| 2018/0209803 A1* | 7/2018 | Rakah | G08G 1/096844 |
| 2018/0209804 A1* | 7/2018 | Rakah | G08G 1/096844 |
| 2018/0209805 A1* | 7/2018 | Rakah | G08G 1/096844 |
| 2018/0209806 A1* | 7/2018 | Rakah | G08G 1/096844 |
| 2018/0211124 A1* | 7/2018 | Rakah | G08G 1/096844 |
| 2018/0211185 A1* | 7/2018 | Rakah | G08G 1/096844 |
| 2018/0211186 A1* | 7/2018 | Rakah | G08G 1/096844 |
| 2018/0211541 A1* | 7/2018 | Rakah | G08G 1/096844 |

* cited by examiner

SYSTEM AND METHOD FOR AUTOMATIC PASSENGER SHARING AMONG VEHICLES

CROSS-REFERENCE TO RELATED APPLICATIONS/INCORPORATION BY REFERENCE

None.

FIELD

Various embodiments of the disclosure relate to automotive technologies. More specifically, various embodiments of the disclosure relate to a system and method for automatic passenger sharing among vehicles.

BACKGROUND

Currently, autonomous or semi-autonomous vehicle technology and associated automotive electronics are one of the most burgeoning segments in the automotive industry. Various experiments are conducted related to the development of automotive electronics for use in vehicles. Currently, vehicles with the autonomous or semi-autonomous drive capability are primarily evaluated for error free drive and for advanced driver assistance systems (ADAS). However, development of technologies and systems related to a better utilization of such autonomous, semi-autonomous, or even non-autonomous vehicles during drive is still at a nascent stage. In certain scenario, sharing of a single vehicle may be initiated at the beginning of a journey by use of various available applications that may be installed on computing devices of passengers. However, the use of such applications is limited to initiate a shared ride in a shared vehicle. Typically, two travel requests raised by two passengers for same destination are mapped to two different vehicles that were nearer to the current location of the corresponding passenger. In such scenarios, two different vehicles are used for commuting to the same destination along the same route. This results in wastage of available resources and contributes to undesired environmental pollution. Thus, an advanced, intelligent, and an automatic system may be desired to provide a better utilization of resources for vehicles and facilitate automatic passenger sharing among the vehicles travelling along the same or similar routes.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for automatic passenger sharing among vehicles is substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1A:
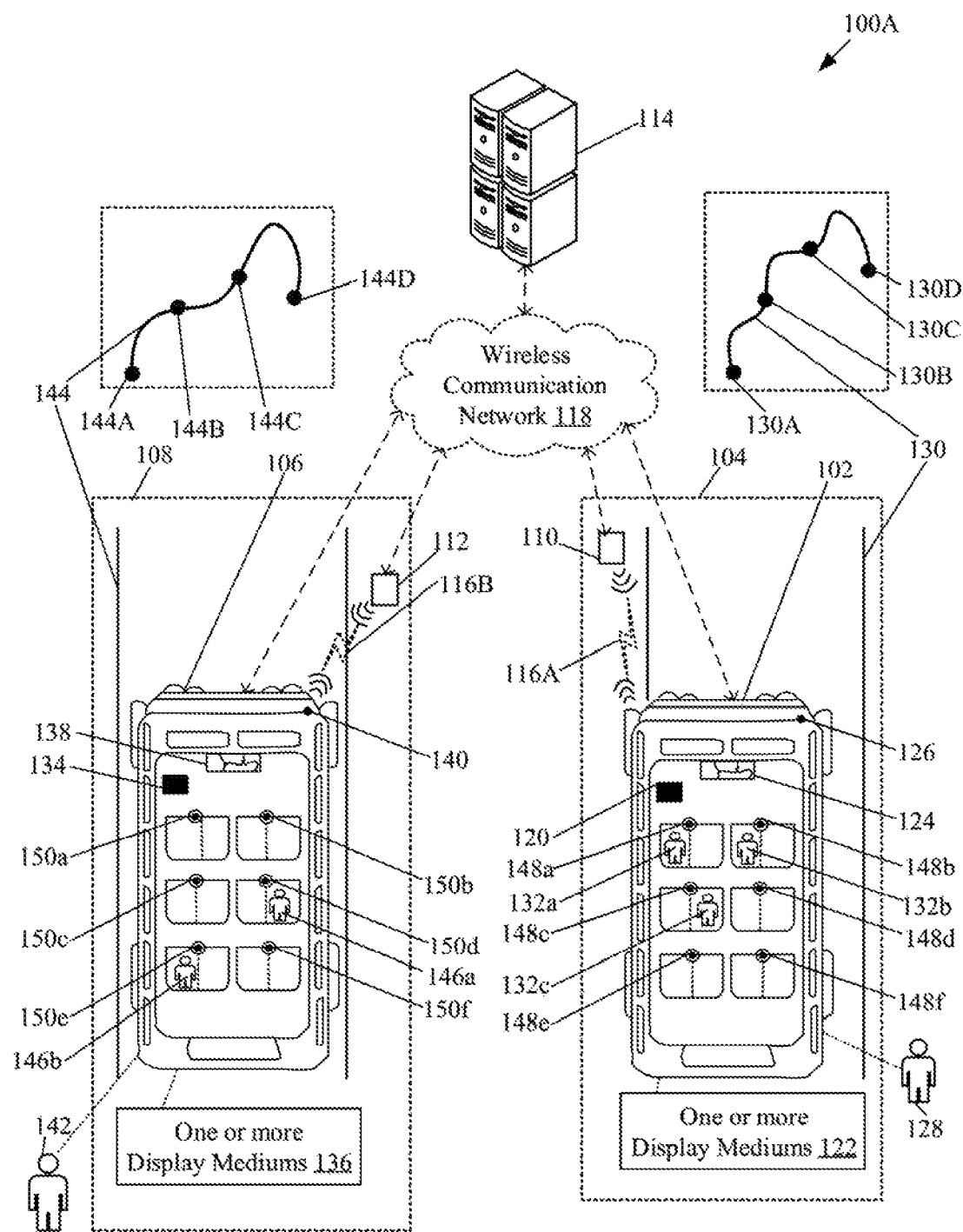
FIG. 1A is a block diagram that illustrates a network environment for automatic passenger sharing among vehicles, in accordance with an embodiment of the disclosure.

The following described implementations may be found in the disclosed system and method for automatic passenger sharing among vehicles. Exemplary aspects of the disclosure may include a system that may include one or more circuits in an electronic control unit (ECU) of a first vehicle. The one or more circuits in the ECU may be configured to communicate a vehicle sharing request to at least one remaining vehicle of a plurality of vehicles. The vehicle sharing request may include at least first seat mapping information and first route information associated with the first vehicle. A second vehicle among the at least one remaining vehicle of the plurality of vehicles is identified for sharing passengers. The second vehicle is identified based on a comparison of the first route information and the first seat mapping information with second route information and second seat mapping information received from the at least one remaining vehicle of the plurality of vehicles. A target vehicle is selected from the identified second vehicle or the first vehicle to allow one or more first passengers of the first vehicle and one or more second passengers of the identified second vehicle to share travel in the selected target vehicle.

In accordance with an embodiment, the vehicle sharing request may be communicated from the first vehicle to the at least one remaining vehicle of the plurality of vehicles through a vehicle-to-X (V2X) communication. The V2X communication may comprise a vehicle-to-vehicle (V2V) communication, a vehicle-to-cloud (V2C) communication, a vehicle-to-infrastructure (V2I) communication, and/or vehicle-to-device (V2D) communication. The communicated vehicle sharing request may further include first vehicle information of the first vehicle. The first vehicle information of the first vehicle may correspond to a vehicle identification number, a vehicle type of the first vehicle, and details of window seats in the first vehicle. The first seat mapping information of the first vehicle may be determined based on one or more images captured by one or more imaging devices provided in the first vehicle.

In accordance with an embodiment, the first seat mapping information of the first vehicle may correspond to a count of vacant seats, a count of occupied seats, a count of the one or more first passengers, seat booking details, and demographic details of the one or more first passengers in the first vehicle. The first route information of the first vehicle may correspond to a first travel route of the first vehicle. The first travel route may comprise a source location, a destination location, and one or more intermediate transit locations. A destination location of the identified second vehicle may be same as that of the destination location of the first vehicle. In some embodiments, a second travel route of the identified second vehicle may correspond to at least a portion of the first travel route of the first vehicle. The first travel route of the first vehicle may correspond to at least a portion of the second travel route of the identified second vehicle.

In accordance with an embodiment, the one or more circuits may be configured to receive an acceptance notification for the communicated vehicle sharing request from the identified second vehicle. The first seat mapping information may be compared with the second seat mapping information received from at least the one remaining vehicle of the plurality of vehicles in accordance with one or more seat mapping rules. The first route information may be compared with the second route information received from the one remaining vehicle of the plurality of vehicles in accordance with one or more route matching rules. The selection of the target vehicle may be based on one or more selection parameters. For instance, the one or more selection parameters may comprise at least a travel route parameter.

In accordance with an embodiment, the one or more circuits may be further configured to communicate a halt instruction in an in-vehicle network to stop the first vehicle at a next intermediate transit location that is common to the first vehicle and the identified second vehicle to transfer the one or more first passengers into the identified second vehicle to share travel, based on the selection of the identified second vehicle as the target vehicle. In some embodiments, the one or more circuits may be configured to communicate the halt instruction in an in-vehicle network to stop the first vehicle at a next intermediate transit location that is common to the first vehicle and the identified second vehicle to transfer the one or more second passengers into the first vehicle to share travel, based on the selection of the first vehicle as the target vehicle.

In accordance with an embodiment, the one or more circuits may be further configured to generate new seat mapping information to include the one or more first passengers of the first vehicle and the one or more second passengers of the identified second vehicle into a common vehicle to share travel. The common vehicle may correspond to the selected target vehicle. The generation of the new seat mapping information may be done based on a feedback received from the one or more first passengers and the one or more second passengers. The one or more first passengers and the one or more second passengers may be seated in the selected target vehicle in accordance with the new seat mapping information. The generated new seat mapping information may be presented to the one or more first passengers and the one or more second passengers through a user interface rendered on a first display device in the first vehicle and a second display device in the identified second vehicle, respectively. In some embodiments, the one or more circuits may be configured to communicate with the identified second vehicle by V2C communication based on an association of the first vehicle and the identified second vehicle with a common travel group.

In accordance with an exemplary aspect of the disclosure, the system for sharing passengers among a plurality of vehicles, may comprise receipt of a vehicle sharing request including at least first seat mapping information and first route information associated with a second vehicle of the plurality of vehicles from the second vehicle. An acceptance notification may be transmitted for the received vehicle sharing request to the second vehicle. The acceptance notification may be transmitted based on at least a comparison of the first route information and the first seat mapping information of the second vehicle with second route information and second seat mapping information of the first vehicle. A halt instruction in an in-vehicle network may be communicated to stop the first vehicle at a specified common transit point of the first vehicle and the second vehicle to include one or more first passengers of the first vehicle and one or more second passengers of the second vehicle to share travel in a target vehicle. The target vehicle may be selected from the first vehicle or the second vehicle. The specified common transit point of the first vehicle and the second vehicle may correspond to a next intermediate transit location that is common between a first travel route of the first vehicle and a second travel route of the second vehicle.

FIG. 1A is a block diagram that illustrates a network environment for automatic passenger sharing among vehicles, in accordance with an embodiment of the disclosure. With reference to FIG. 1A, there is shown an exemplary network environment 100A. The network environment 100A may include a plurality of vehicles, such as a first vehicle 102 in a first location 104 and a second vehicle 106 in a second location 108. There is also shown one or more external communication devices, such as a first communication device 110, a second communication device 112, and a central communication device, such as a server 114, a first wireless communication channel 116A, a second wireless communication channel 116B, and a wireless communication network 118.

The first vehicle 102 may include an electronic control unit (ECU) 120, one or more display mediums 122, a navigation unit 124, and one or more video-capturing units, such as a video-capturing unit 126. There is further shown a first user 128 associated with the first vehicle 102 that may be in motion along a first travel route 130. The first travel route 130 may include a source location 130A, one or more intermediate transit locations 130B to 130C, and a destination location 130D. There is further shown one or more first passengers 132a to 132c travelling in the first vehicle 102 along the first travel route 130. The second vehicle 106 may also include an ECU 134, one or more display mediums 136, a navigation unit 138, and one or more video-capture units, such as a video-capturing unit 140. There is further shown a second user 142 associated with the second vehicle 106 that may be in motion along a second travel route 144. There is further shown one or more second passengers 146a and 146b travelling in the second vehicle 106 along the second travel route 144. The second travel route 144 may include a source location 144A, one or more intermediate transit locations 144B and 144C, and a destination location 144D. A plurality of first inner cameras 148a to 148f may be installed in the interior of the first vehicle 102 to capture one or more images or video of in-vehicle users, such as the one or more first passengers 132a to 132c, of the first vehicle 102. Similarly, a plurality of second inner cameras 150a to 150f may be installed in the interior of the second vehicle 106 to capture one or more images or video of in-vehicle users, such as the one or more second passengers 146a to 146b, of the second vehicle 106.

The first vehicle 102 may refer to an autonomous vehicle or a semi-autonomous vehicle, for example, as defined by National Highway Traffic Safety Administration (NHTSA). In some embodiments, the first vehicle 102 may refer to a non-autonomous vehicle. The first vehicle 102 may travel along the first travel route 130. Examples of the first vehicle 102 may include, but are not limited to, a car, a hybrid vehicle, and/or a vehicle with an autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. There are a plurality of differ categories or levels of vehicles of what is considered to be semi-autonomous and autonomous. For example, the National Highway Traffic Safety Administration (NHTSA) in the United States proposes a classification for driving system as follows. The system and method of the present disclosure may be applied for vehicles with an autonomous function such as autonomous braking, autonomous cruise control, autonomous driving, etc. In the following examples, the system and method of the present disclosure may also be applied for vehicles from Level 1 to Level 4. According to the NHTSA, in "Level 0" category of vehicles, the driver completely controls the vehicle at all times. A Vehicle of "Level 0" category may also be referred to as non-autonomous vehicle. In "Level 1" category, individual vehicle controls may be automated, such as electronic stability control or automatic braking. In "Level 2" category, at least two controls may be automated together simultaneously, such as an adaptive cruise control together with a lane keeping control. In "Level 3" category, the level of autonomous control increases, where a vehicle may perform safety-critical functions in certain conditions. The vehicle may sense when conditions require the driver to retake control and provides a "sufficiently comfortable transition time" for the driver to do so. A Vehicle of "Level 1", "Level 2", or "Level 3" category may also be referred to as partially-autonomous or semi-autonomous vehicle. In "Level 4" category, the vehicle may perform all safety-critical functions where the driver is not expected to control the vehicle at any time. As this category of vehicle may control all functions from start to stop, including all parking functions, it may be a driverless vehicle (also referred to as self-driving vehicle, fully-autonomous vehicle.

The first location 104 may refer to a current geo-location point along a current travel route, such as the first travel route 130, undertaken by the first vehicle 102. For example, the first user 128 may want to begin a ride from a current location, such as the source location 130A, of the first vehicle 102 to the destination location 130D through one or more intermediate transit locations 130B and 130C. To begin an autonomous or semi-autonomous drive, it may be required to at least feed the destination location 130D by use of the navigation unit 124 of the first vehicle 102. The navigation unit 124 may calculate a route from the source location 130A to the destination location 130D via the one or more intermediate transit locations 130B and 130C to be undertaken by the first vehicle 102 during the ride. This route calculated at the start of a ride may be considered a current travel route, such as the first travel route 130, of the first vehicle 102. The ECU 120 of the first vehicle 102 may receive the input information that includes the current travel route, such as the first travel route 130, to be undertaken by the first vehicle 102, from the navigation unit 124, via an in-vehicle network of the first vehicle 102.

The second vehicle 106 may refer to an autonomous vehicle, a semi-autonomous vehicle, or a non-autonomous vehicle. The second vehicle 106 may travel along the second travel route 144. Examples of the second vehicle 106 may include, but are not limited to, a car, a hybrid vehicle, and/or a vehicle with or without an autonomous drive capability that uses one or more distinct renewable or non-renewable power sources. Examples of the renewable or non-renewable power sources may include fossil fuel, electric propulsion, hydrogen fuel, solar-power, and/or other forms of alternative energy.

The second location 108 may refer to a current geo-location point along a current travel route, such as the second travel route 144, undertaken by a different vehicle, such as the second vehicle 106. The second location 108 may correspond to a location that is within a communication range of the first vehicle 102. For example, the first vehicle 102 may be capable of communicating with any other vehicle that is within a communication range, for example, a radius of "500 meters" from a current location of the first vehicle 102. In such a scenario, the second location 108 may correspond to the location that is within the "500 meters" radius from the current location of the first vehicle 102. It should be readily understood that that communication range may be dependent on factors such as, for example, the communication technology, surrounding environment, communication medium, and so on.

The first communication device 110 may comprise suitable logic, circuitry, interfaces, and/or code that may be configured to communicate with the first vehicle 102, via the first wireless communication channel 116A, such as a dedicated short-range communication (DSRC) channel or other short or medium range wireless communication channel. The first communication device 110 may also communicate with the central communication device, such as the server 114, via the wireless communication network 118. The first communication device 110 may comprise one or more sensors, such as a geospatial position detection sensor, a movement detection sensor, and/or a speed sensor to detect a position, a movement, or a speed of a vehicle, such as the first vehicle 102, from a defined proximal distance. The first communication device 110 may be configured to communicate (receive and/or transmit) various types of information from/to a wireless communication system of the first vehicle 102. Examples of the first communication device 110 may include, but are not limited to, a road side unit (RSU), a mobile device, a wearable device worn by a user of the first vehicle 102, such as a smart-glass, and/or a communication device removably coupled to the first vehicle 102.

The second communication device 112 may comprise suitable logic, circuitry, interfaces, and/or code that may be configured to communicate with the second vehicle 106, via the second wireless communication channel 116B, such as a dedicated short-range communication (DSRC) channel or other short or medium range wireless communication channel. The second communication device 112 may also communicate with the central communication device, such as the server 114, via the wireless communication network 118. The second communication device 112 may be configured to communicate various types of information from/to a wireless communication system of the second vehicle 106. Examples of the second communication device 112 may be similar to that of the first communication device 110.

The server 114 may comprise suitable logic, circuitry, interfaces, and/or code that may be configured to establish a communication channel with one or more vehicles, such as the first vehicle 102 and the second vehicle 106. The server 114 may be configured to receive information from the various vehicles, such as the first vehicle 102 and the second vehicle 106. The server 114 may be a cloud server, a web server, a database server, a file server, an application server, or a combination thereof. The server 114 may be implemented by use of several technologies that are well known to those skilled in the art.

The first wireless communication channel 116A may include a short or a medium range communication medium through which the first vehicle 102 may communicate with one or more other vehicles (such as the second vehicle 106) and/or the first communication device 110. A direct communication between the first vehicle 102 and the one or more other vehicles (such as the second vehicle 106) through the first wireless communication channel 116A may correspond to vehicle-to-vehicle (V2V) communication. In such type of communication vehicles communicate with each other directly without any intermediate device (such as the first communication device 110 or the second communication device 112). A defined proximal distance within which the first vehicle 102 may communicate with one or more other vehicles by use of the first wireless communication channel 116A may correspond to the communication range of the first vehicle 102. In some embodiment, the one or more other vehicles (such as the second vehicle 106) may not be in the communication range of the first vehicle 102. In such scenarios, the first vehicle 102 may communicate with the one or more other vehicles (such as the second vehicle 106) through the first wireless communication channel 116A by use of vehicle-to-X (V2X) communication. For example, the first vehicle 102 may want to communicate with the second vehicle 106 that is out of the communication range of the first vehicle 102. Thus, the first vehicle 102 may transmit the information to be communicated to the second vehicle 106 to the first communication device 110 through the first wireless communication channel 116A (i.e., V2X communication). The first communication device 110 may further transmit the information to the second communication device 112, which in turn communicates the information to the second vehicle 106 through the second wireless communication channel 116B (V2X communication). Examples of the first wireless communication channel 116A may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a Wireless Fidelity (Wi-Fi) network, and/or a Wireless Local Area Network (WLAN). The first vehicle 102 may be configured to connect with various devices in the network environment 100A via the first wireless communication channel 116A, in accordance with various wireless communication protocols. Examples of such wireless communication protocols may include, but are not limited to, IEEE 802.11, 802.11x, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, light-fidelity (Li-Fi), infrared (IR), Bluetooth (BT) communication protocols, and/or variants thereof.

The second wireless communication channel 116B may include a short or a medium range communication medium through which the second vehicle 106 may communicate with one or more other vehicles (such as the first vehicle 102) and/or the second communication device 112. Examples and functionality of the second wireless communication channel 116B may be similar to that of the first wireless communication channel 116A.

The wireless communication network 118 may include a long range communication medium through which the one or more vehicles, such as the first vehicle 102 and the second vehicle 106, and the external communication devices, such as the first communication device 110 and the second communication device 112, may communicate with the server 114. Examples of the wireless communication network 118 may include, but are not limited to, the Internet, Internet based mobile ad-hoc networks (IMANET), a cellular network, such as a long-term evolution (LTE) network, a cloud network, and/or a Wide Area Network (WAN). Various devices in the network environment 100A may be configured to connect to the wireless communication network 118, in accordance with various wireless communication protocols. Examples of such wireless communication protocols may include, but are not limited to, IEEE 802.11, 802.11x, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, Li-Fi, and/or other wireless communication protocols.

The ECU 120 may comprise suitable logic, circuitry, interfaces, and/or code that may be configured to receive input information that includes at least a current travel route (such as the first travel route 130) to be undertaken by the first vehicle 102. The ECU 120 may be configured to access sensor data from one or more vehicle sensors of a sensing system, and/or other vehicle data associated with the first vehicle 102. The sensor data may be accessed by the ECU 120, via an in-vehicle network, such as a vehicle area network (VAN) and/or in-vehicle data bus, such as a controller area network (CAN) bus. In accordance with an embodiment, the ECU 120 may be configured to communicate with various other vehicles (such as the second vehicle 106), external communication devices (such as the first communication device 110) and/or a cloud server (such as the server 114) via the first wireless communication channel 116A and/or via the wireless communication network 118 by use of V2X communication. The V2X communication may include V2V communication, V2C communication, V2I communication, and/or V2D communication.

The one or more display mediums 122 may comprise suitable logic, circuitry, interfaces, and/or code that may be configured to display various types of information and/or entertainment content under the control of the ECU 120. The interface may be a customized user interface (UI) configured to display the various types of information and/or the entertainment content to occupants of the first vehicle 102, such as the one or more first passengers 132a to 132c. In accordance with an embodiment, each of the one or more display mediums 122 may be installed at one or more seats in the first vehicle 102. The one or more display mediums 122 may be a touch screen configured to receive an input from the one or more first passengers 132a to 132c when the one or more first passengers 132a to 132c are boarded in the first vehicle 102. In some embodiments, the one or more display mediums 122 may correspond to a front windshield, a rear windshield, and other side windows of the first vehicle 102. The front windshield, the rear windshield, and other side windows, such as left windows and right windows of the first vehicle 102, may be configured to display various types of information and the entertainment content. In some embodiments, in accordance with yet another embodiment, the interior of an autonomous vehicle, such as the first vehicle 102, may be adapted such that various types of information and entertainment content may be displayed to one or more first passengers 132a to 132c. In case of an autonomous ride, the front and rear windshield may not have a necessary requirement to be transparent or interference free visually as against a manual ride (from driver's viewpoint) of a non-autonomous vehicle, such as a manual car. The scope of the disclosure may not be limited to the one or more display mediums 122 as display devices installed in the first vehicle 102, the front windshield, the rear windshield, and other side windows of the first vehicle 102, or the modified interior of the first vehicle 102. Other display mediums, for example, a heads-up display (HUD), a heads-up display with an augmented reality system (AR-HUD), a driver information console (DIC), a projection-based display, a see-through display, and/or an electro-chromic display, may be used as the one or more display mediums 122. The AR-HUD may be a combiner-based AR-HUD. The one or more display mediums 122 may be a transparent or a semi-transparent display screen.

The navigation unit 124 may comprise suitable logic, circuitry, interfaces, and/or code that may be configured to calculate a travel route (such as the first travel route 130) for the first vehicle 102. For example, the navigation unit 124 may prompt the first user 128 to feed a destination location. In some embodiments, the navigation unit 124 may allow the first user 128 to select preferences for one or more intermediate transit locations to reach the destination location. The navigation unit 124 may then calculate a route, such as the first travel route 130, from the source location 130A of the first vehicle 102 to the destination location 130D to be undertaken by the first vehicle 102. The calculated route from the source location 130A of the first vehicle 102 to the destination location 130D may further include the one or more intermediate transit locations 132B and 132C. The one or more intermediate transit locations 132B and 132C may be defined for a particular route, selected based on received user preferences or automatically calculated by the navigation unit 124. For instance, the source location 132A may correspond to a current location of the first vehicle 102. In such a scenario, the navigation unit 124 may calculate the first travel route 130 from the current location of the first vehicle 102 to the destination location 132D. The navigation unit 124 may comprise one or more sensors, such as a global positioning system (GPS) sensor, and/or a speed sensor to detect a current location, or a speed of a vehicle, such as the first vehicle 102. The navigation unit 124 may use one or more route identification algorithms known in the art for the calculation of the route. In accordance with an embodiment, the navigation unit 124 may further take into account traffic conditions along various routes connecting the source location 130A and the destination location 130D for the calculation of the route (such as the first travel route 130) for the first vehicle 102. For example, the navigation unit 124 may calculate a route connecting the source location 130A and the destination location 130D that has minimum traffic in comparison to traffic on other routes connecting the source location 130A and the destination location 130D.

The video-capturing unit 126 may comprise suitable logic, circuitry, interfaces, and/or code that may be configured to capture one or more videos while the first vehicle 102 moves along the first travel route 130. In some embodiment, the first vehicle 102 may include a plurality of video-capturing units, such as the video-capturing unit 126. Examples of the video-capturing unit 126 may include, but are not limited to, an action cam, an image sensor, a wide-angle camera, a closed-circuit television (CCTV) camera, a camcorder, a night-vision camera, and/or other such vehicle cameras.

The plurality of first inner cameras 148a to 148f may comprise suitable logic, circuitry, interfaces, and/or code that may be configured to capture one or more images of the in-vehicle users, such as the one or more first passengers 132a to 132c. Examples of the plurality of first inner cameras 148a to 148f may include, but are not limited to, an action cam, an image sensor, a wide-angle camera, a closed-circuit television (CCTV) camera, a camcorder, a time-of-flight camera (ToF camera), a night-vision camera, and/or other such in-vehicle cameras or sensors.

In accordance with an embodiment, the ECU 134, the one or more display mediums 136, the navigation unit 138, and the video-capturing unit 140 of the second vehicle 106 may be similar to that of the ECU 120, the one or more display mediums 122, the navigation unit 124, and the video-capturing unit 126, respectively, of the first vehicle 102. The ECU 134 may be configured to communicate with various other vehicles (such as the first vehicle 102), various external communication devices (such as the second communication device 112), and/or a cloud server (such as the server 114) via the second wireless communication channel 116B and/or the wireless communication network 118. In accordance with an embodiment, the plurality of second inner cameras 150a to 150f of the second vehicle 106 may be similar to that of the plurality of first inner cameras 148a to 148f of the first vehicle 102.

In operation, a user, such as the first user 128, may feed a destination location (such as the destination location 130D) by use of the navigation unit 124 of the first vehicle 102. The navigation unit 124 may calculate a route (such as the first travel route 130) from a current location (e.g. the source location 130A) to the destination location 130D via the one or more intermediate transit locations (such as the one or more intermediate transit locations 130B and 130C) to be undertaken by the first vehicle 102. The one or more intermediate transit locations 132B and 132C may be defined for the first travel route 130, selected based on received user preferences or automatically calculated by the navigation unit 124. The first vehicle 102 may be operating in an autonomous drive mode, a semi-autonomous mode, or a manual mode. One or more individuals (such as the one or more first passengers 132a to 132c) may board the first vehicle 102 to commute along the first travel route 130. The ECU 120 of the first vehicle 102 may communicate a start command to each of the plurality of first inner cameras 148a to 148f to initiate capture of a video and/or one or more images of the one or more first passengers 132a to 132c by the plurality of first inner cameras 148a to 148f. The plurality of first inner cameras 148a to 148f may capture a video and/or one or more images of the one or more first passengers 132a to 132c, who are seated in the first vehicle 102. The plurality of first inner cameras 148a to 148f may be installed in the first vehicle 102, such that each first inner camera in the plurality of first inner cameras 148a to 148f captures the video or the one or more images of a passenger within the first vehicle 102. For instance, the first inner camera 148a may be mounted such that the first inner camera 148a may capture the video and/or the one or more images of a passenger (such as the first passenger 132a) seated on a seat with the seat identification number "S_1". In some embodiments, the plurality of first inner cameras 148a to 148f may be enabled capture a 360 degree view of the interior of the first vehicle 102.

The ECU 120 of the first vehicle 102 may be further configured to retrieve various types of information related to the first vehicle 102. The various types of information may include first route information associated with the first vehicle 102. The first route information of the first vehicle 102 may correspond to information pertaining to a travel route to be taken by the first vehicle 102. For example, the first route information of the first vehicle 102 may correspond to the information pertaining to the first travel route 130, which may further include details related to the source location 130A, the destination location 130D, and the one or more intermediate transit locations 130B to 130C included in the first travel route 130. The ECU 120 may retrieve the first route information of the first vehicle 102 from the navigation unit 124.

The various types of information related to the first vehicle 102 may further include first seat mapping information. The first seat mapping information may correspond to details related to a count of vacant seats, a count of occupied seats, a count of one or more first passengers (such as the one or more first passengers 132a to 132c) in the first vehicle 102, seat booking details, and demographic details of the one or more first passengers 132a to 132c in the first vehicle 102. The ECU 120 may be configured to determine the first seat mapping information of the first vehicle 102 by the videos or one or more images captured by the plurality of first inner cameras 148a to 148f. The ECU 120 may execute one or more image processing techniques known in the art on the captured videos and/or the one or more images to determine the first seat mapping information of the first vehicle 102. For example, the ECU 120 may use the captured one or more images and/or video to determine the count of vacant seats, the count of occupied seats, the count of one or more first passengers 132a to 132c, and the seat identification numbers of the plurality of seats in the first vehicle 102. The ECU 120 may further use the captured one or more images and/or video to determine the demographic details (such as the gender and/or age) and the seat booking details of the one or more first passengers 132a to 132c in the first vehicle 102. For example, the ECU 120 may execute one or more face detection algorithms on the captured one or more images and/or videos to detect face (i.e., facial portion) of the one or more first passengers 132a to 132c. The ECU 120 may extract details of the one or more first passengers 132a to 132c from a passenger database server (not shown) based on a matching of the detected faces of the one or more first passengers 132a to 132c with previously stored passenger details in the passenger database server. The details of the one or more first passengers 132a to 132c may include, for example, the demographic details and seat booking details of the one or more first passengers 132a to 132c.

The various types of information related to the first vehicle 102 may further include first vehicle information associated with the first vehicle 102. The first vehicle information of the first vehicle 102 may include a vehicle identification number (such as "FS-234"), a vehicle type (such as "semi-sleeper", "full-sleeper, "air-conditioned", and/or non-air-conditioned") of the first vehicle 102, and/or details of window seats in the first vehicle 102. The details of window seats in the first vehicle 102 may further include a count of window seats and a seat identification number of the window seats in the first vehicle 102.

The ECU 120 may be further configured to communicate a vehicle sharing request via the first wireless communication channel 116A to remaining vehicles in the plurality of vehicles (such as the second vehicle 106). Alternatively stated, the first vehicle 102 may correspond to a transmitting vehicle that transmits the vehicle sharing request via the first wireless communication channel 116A, such as in a V2V communication broadcast. In some embodiments, the first vehicle 102 may transmit the vehicle sharing request via the wireless communication network 118 (such as in a V2C communication broadcast) to communicate with vehicles that are out the communication range of the first vehicle 102.

The vehicle sharing request may include the information (such as the first route information, the first seat mapping information, and the first vehicle information) associated with the first vehicle 102 which is retrieved by the ECU 120. The vehicle sharing request may be received by the remaining vehicles in the plurality of vehicles that are in the communication range of the first wireless communication channel 116A. For instance, the communication range of the first wireless communication channel 116A may be "500 m". In such a scenario, the remaining vehicles that are within "500 m" of the current location of the first vehicle 102 may receive the vehicle sharing request of the first vehicle 102. For example, the second vehicle 106 may receive the vehicle sharing request from the first vehicle 102. In some embodiments, the vehicles that are not in or outside of the communication range of the first wireless communication channel 116A and are associated with a same travel group as the first vehicle 102 may receive the vehicle sharing request from a cloud server (such as the server 114) through V2C communication.

The ECU 134 of the second vehicle 106 may be configured to receive the vehicle sharing request from the first vehicle 102. The ECU 134 may further retrieve various types of information related to the second vehicle 106. The various types of information may include second route information, second seat mapping information, and second vehicle information associated with the second vehicle 106. The ECU 134 may retrieve the second route information, the second seat mapping information, and the second vehicle information from an in-vehicle network of the second vehicle 106. The ECU 134 may further compare the first route information included in the received vehicle sharing request with the second route information. The ECU 134 may compare the first route information with the second route information in accordance with one or more route matching rules. The one or more route matching rules may include a complete route match rule and a partial route match rule. The comparison of the first route information with the second route information in accordance with one or more route matching rules is described in detail, for example, in FIGS. 1B, 1C, and 1D.

The ECU 134 may be further configured to compare the first seat mapping information and the first vehicle information included in the received vehicle sharing request with the second seat mapping information and the second vehicle information of the second vehicle 106, respectively. The ECU 134 may compare the first vehicle information with the second vehicle information and identify a match between the first vehicle information with the second vehicle information. For example, the first vehicle information of the first vehicle 102 may be (vehicle id: FS-234, vehicle type: semi-sleeper and air-conditioned) and the second vehicle information of the second vehicle 106 may be (vehicle id: FS-235, vehicle type: semi-sleeper and air-conditioned). The ECU 134 may compare the first vehicle information with the second vehicle information. The ECU 134 may establish that the first vehicle information matches with the second vehicle information based on the comparison.

The ECU 134 may be further configured to compare the first seat mapping information with the second seat mapping information in accordance with one or more seat mapping rules. The one or more seat mapping rules may include a first seat mapping rule based on which passengers of same gender are seated at adjacent seats and a second seat mapping rule based on which passengers with same booking identifier (id) are assigned adjacent seats. The one or more seat mapping rules may further include a third seat mapping rule based on which a disabled passenger is assigned a "disabled person seat" and a fourth mapping rule based on which a seat is assigned to a passenger in accordance with a pre-specified seat specification of the passenger. For example, according to a pre-specified seat specification of a passenger, the passenger may want to be seated at a window seat. In this scenario, according to the fourth seat mapping rule the passenger may only be assigned a window seat. The ECU 134 may compare the first seat mapping information with the second seat mapping information to determine whether the one or more seat mapping rules are satisfied. The ECU 134 may establish a satisfaction of the one or more seat mapping rules if the one or more first passengers 132a to 132c may be accommodated in the second vehicle 106 along with the one or more second passengers 146a to 146b without violating the one or more seat mapping rules. The ECU 134 may further establish a satisfaction of the one or more seat mapping rules if the one or more second passengers 146a to 146b may be accommodated in the first vehicle 102 along with the one or more first passengers 132a to 132c without violating the one or more seat mapping rules.

The ECU 134 may be configured to transmit an acceptance notification to the first vehicle 102 for the vehicle sharing request, based on the one or more seat mapping rules and the one or more route matching rules being satisfied. The ECU 134 may transmit the acceptance notification to the first vehicle 102 via the second wireless communication channel 116B or the wireless communication network 118. In some embodiments, the ECU 134 may not transmit the acceptance notification based on the one or more seat mapping rules or the one or more route matching rules that is unsatisfied or not satisfied.

In some embodiments, the ECU 134 may communicate the retrieved information related to the second vehicle 106, to the first vehicle 102. In such embodiments, the comparison of the first route information with the second route information and the comparison of the first seat mapping information with the second seat mapping information may be executed by the ECU 120. In this scenario, the ECU 120 may transmit a comparison result to the second vehicle 106 based on the one or more route matching rules and the one or more seat mapping rules being satisfied. Hence, the ECU 134 may transmit the acceptance notification to the first vehicle 102 based on the comparison result. The comparison of the first route information with the second route information and the comparison of the first seat mapping information with the second seat mapping information are explained in detail, for example, in FIGS. 3A to 3E.

The ECU 120 may be configured to receive one or more acceptance notifications from remaining plurality of vehicles that is in the communication range of the first vehicle 102 and for which the one or more route matching rules and the one or more seat mapping rules are satisfied. The ECU 120 may be further configured to identify a vehicle from the remaining plurality of vehicles for sharing passengers based on the received one or more acceptance notifications. Alternatively stated, the ECU 120 may identify a vehicle (such as the second vehicle 106) for sharing passengers based on the comparison of the first route information and the first seat mapping information with the second route information and the second seat mapping information, respectively. For example, the ECU 120 may identify the second vehicle 106 for sharing passengers based on the acceptance notification received from the ECU 134.

The ECU 120 may be further configured to select a target vehicle from the identified second vehicle 106 or the first vehicle 102. The target vehicle may be selected to allow the one or more first passengers 132a to 132c of the first vehicle 102 and the one or more second passengers 146a to 146b of the second vehicle 106 to share travel in the selected target vehicle. The ECU 120 may select the target vehicle based on one or more selection parameters. The one or more selection parameters may comprise a travel route parameter, a passenger count parameter, and a seat mapping parameter. For instance, the ECU 120 may select a vehicle (i.e., the identified second vehicle 106 or the first vehicle 102) that has a maximum count of passengers (i.e., the passenger count parameter) as the target vehicle. For example, the first vehicle 102 has three passengers (i.e., the one or more first passengers 132a to 132c), whereas the second vehicle 106 has two passengers. Therefore, the first vehicle 102 may be selected as the target vehicle by the ECU 120. In some embodiments, the one or more seat mapping rules may be satisfied when it is determined that the one or more first passengers 132a to 132c can be exclusively accommodated in the second vehicle 106 along with the one or more second passengers 146a to 146b. Thus, the ECU 120 may select the second vehicle 106 as the target vehicle. In this scenario, the selection of the second vehicle 106 as the target vehicle is in accordance with the seat mapping parameter as preference is given to the satisfaction of the one or more seat mapping rules irrespective of the count of passengers in the first vehicle 102 and the second vehicle 106.

In some embodiments, a travel route of a vehicle may be a portion (e.g. a small stretch/sub-route) of a travel route of another vehicle. For example, the first travel route 130 of the first vehicle 102 may correspond to a sub-route of the second travel route 144 of the second vehicle 106. In this scenario, the ECU 120 may select the second vehicle 106 as the target vehicle. The selection of the second vehicle 106 as the target vehicle is in accordance with the travel route parameter. The selection of the target vehicle based on one or more selection parameters is further explained, for example, in FIGS. 3A to 3E.

The ECU 120 may be further configured to generate new seat mapping information to include the one or more first passengers 132a to 132c and the one or more second passengers 146a to 146b into a common vehicle for the shared travel. The common vehicle may correspond to the selected target vehicle and the new seat mapping is also generated for the selected target vehicle. For example, the ECU 120 may generate the new seat mapping information for the first vehicle 102 if the first vehicle is selected as the target vehicle to include the one or more first passengers 132a to 132c and the one or more second passengers 146a to 146b. The ECU 120 may be configured to transmit the new seat mapping information to the second vehicle 106.

The ECU 120 may be further configured to communicate a halt instruction to stop the first vehicle 102 at a next intermediate transit location that is common to the first vehicle 102 and the second vehicle 106. The next intermediate transit location may correspond to a next transit point that is common to the first travel route 130 and the second travel route 144. The ECU 120 may further communicate an instruction to the second vehicle 106 to synchronize the halting or the stoppage at the detected next intermediate transit location. The first vehicle 102 and the second vehicle 106 may be halted or stopped at the next intermediate transit location based on the communicated halt instruction to include the one or more first passengers 132a to 132c and the one or more second passengers 146a to 146b in the selected target vehicle. For example, the first vehicle 102 may be selected as the target vehicle. In such a case, the one or more second passengers 146a to 146b may be transferred into the first vehicle 102 to share travel for the remaining travel route with the one or more first passengers 132a to 132c in the first vehicle 102. In some embodiments, the second vehicle 106 may be selected as the target vehicle. In such a case, the one or more first passengers 132a to 132c may be transferred into the second vehicle 106 to share travel for the remaining travel route with the one or more second passengers 146a to 146b in the second vehicle 106. The one or more first passengers 132a to 132c and the one or more second passengers 146a to 146b may be seated in accordance with the new seat mapping information in the selected target vehicle. The selected target vehicle may then start the travel for the remaining route from the stoppage point and the other vehicle may stop the travel. For example, the first vehicle 102 may be selected as the target vehicle. In such a case, the first vehicle 102 may start the travel for the remaining route after the one or more second passengers 146a to 146b are accommodated in the first vehicle 102 along with the one or more first passengers 132a to 132c. The second vehicle 106 may stop the travel at the stoppage point.

In accordance with an embodiment, the first vehicle 102 may be configured to periodically transmit the vehicle sharing request to the remaining vehicles in the plurality of vehicles. For example, the first vehicle 102 may transmit the vehicle sharing request to the remaining vehicles after every "one minute". The repeated transmission of the vehicle sharing request by the first vehicle 102 may continue until an acceptance notification is received by the ECU 120 of the first vehicle 102. In another scenario, the repeated transmission of the vehicle sharing request by the first vehicle 102 may continue until there is no vacant seat in the first vehicle 102. The acceptance notification may further include vehicle information related to vehicles that are participating in passenger sharing. For example, the first vehicle 102 and the second vehicle 106 may be in communication with each other to share passengers between them. In such a case, the acceptance notification may include the first vehicle information and the second vehicle information. Further, the first vehicle 102 may be in communication with the second vehicle 106 for passenger sharing and receives an acceptance notification that includes vehicle information of the second vehicle 106 and a third vehicle (not shown) but does not include the first vehicle information. In this scenario, the ECU 120 may discard the acceptance notification and continue to transmit the vehicle sharing request.

In accordance with an embodiment, new passengers may board the plurality of vehicles (such as the first vehicle 102 and the second vehicle 106) at one or more intermediate transit locations along the travel route of the plurality of vehicles. Thus, the seat mapping information pertaining to each vehicle in the plurality of vehicles may be updated when new passengers aboard the plurality of vehicles. Each passenger (such as the one or more first passengers 132a to 132c and the one or more second passengers 146a to 146b) may be associated with an access card, such that while boarding a vehicle (such as the first vehicle 102 or the second vehicle 106) each of the one or more passengers may swipe the access card to book a seat in the corresponding vehicle. The booking ids of each of the one or more passengers may be determined based on the access card swipe. In some embodiments, each of the one or more passengers (such as the one or more first passengers 132a to 132c or the one or more second passengers 146a to 146b) may book a seat in a corresponding vehicle (such as the first vehicle 102 or the second vehicle 106) by use of a personal device, such as a dedicated smartphone (not shown). The ECU 120 may further determine an alighting location of each of the one or more first passengers 132a to 132c based on the determination of the booking id of each of the one or more first passengers 132a to 132c. In accordance with an embodiment, the ECU 120 may further extract the demographic details of the one or more first passengers 132a to 132c from the corresponding social media profiles of the first passengers 132a to 312c. For example, the ECU 120 may execute one or more face detection algorithms on the captured one or more images and/or videos to detect faces (i.e., facial portion) of the one or more first passengers 132a to 132c. The ECU 120 may further identify the social media profiles of the one or more first passengers 132a to 132c based on a matching of the detected faces of the one or more first passengers 132a to 132c on the social media websites. Thus, the ECU 120 may extract the demographic details of the one or more first passengers 132a to 132c from the identified corresponding social media profiles. The ECU 120 may further store the demographic details of the one or more first passengers 132a to 132c in a passenger database server, such as the server 114. The extracted demographic details of the one or more first passengers 132a to 132c may be included in the seat mapping information of the first vehicle 102.In some embodiments, the booking id of each of the one or more first passengers 132a to 132c may be used for the extraction of demographic details.

In accordance with an embodiment, the second vehicle 106 may move beyond the communication range of the first vehicle 102 after transmitting the acceptance notification. In such a scenario, if the first vehicle 102 and the second vehicle 106 are associated with same travel group, the first vehicle 102 may further communicate with the second vehicle 106 by using V2C communication. For example, the first vehicle 102 and the second vehicle 106 may be owned by a same travel agency "X". In this scenario, if the second vehicle 106 moves beyond the communication range of the first vehicle 102 after transmitting the acceptance notification, the first vehicle 102 may further communicate with the second vehicle 106 through a dedicated cloud server (such as the server 114) of the travel agency "X" by use of V2C communication. Thus, the first vehicle 102 may transmit the new seat mapping information to the second vehicle 106 via the first wireless communication channel 116A and/or the wireless communication network 118. In some embodiments, the first vehicle 102 may communicate the new seat mapping information to the first communication device 110 (e.g. an RSU) which in turn is further communicated to the second communication device 112 (e.g. another RSU). The second communication device 112 may further communicate the new seat mapping information to the second vehicle 106 via the second wireless communication channel 116B.

In accordance with an embodiment, vehicle information of vehicles participating in the vehicle sharing may be transmitted along with the new seat mapping information. For example, the ECU 120 may transmit the first vehicle information and vehicle information of identified vehicle (i.e., the second vehicle information of the second vehicle 106) along with the new seat mapping information to the second vehicle 106. The transmission of the vehicle information along with the new seat mapping information confirms that the received new seat mapping information is based on a previously transmitted acceptance notification. Thus, the ECU 134 may discard received new seat mapping information, if the second vehicle information is not received along with the new seat mapping information. The new seat mapping information may be presented to the one or more first passengers 132a to 132c and the one or more second passengers 146a to 146b through various user interfaces rendered on the one or more display mediums 122 and the one or more display mediums 136, respectively. The one or more first passengers 132a to 132c and the one or more second passengers 146a to 146b may further provide feedback for the new seat mapping information by use of the one or more display mediums 122 and the one or more display mediums 136, respectively. The ECU 120 may be further configured to modify or update the new seat mapping information based on the feedback provided by the one or more first passengers 132a to 132c and the one or more second passengers 146a.

In accordance with an embodiment, the ECU 134 may be configured to receive the vehicle sharing request from the first vehicle 102 if a pool flag in the ECU 134 is set to "1", else the ECU 134 may discard the received vehicle sharing request received from the first vehicle 102. In other words, a vehicle may set preferences to opt in for vehicle sharing by setting the pool flag to "1" and allow receipt of vehicle sharing request or opt out from vehicle sharing by setting the pool flag to "0".

In some embodiments, the first vehicle 102 may also act or operate as a receiving vehicle at certain time instances and the second vehicle 106 may correspond to a transmitting vehicle. In such a case, the vehicle sharing request may be received by the first vehicle 102 from the second vehicle 106.

Figure 1B:
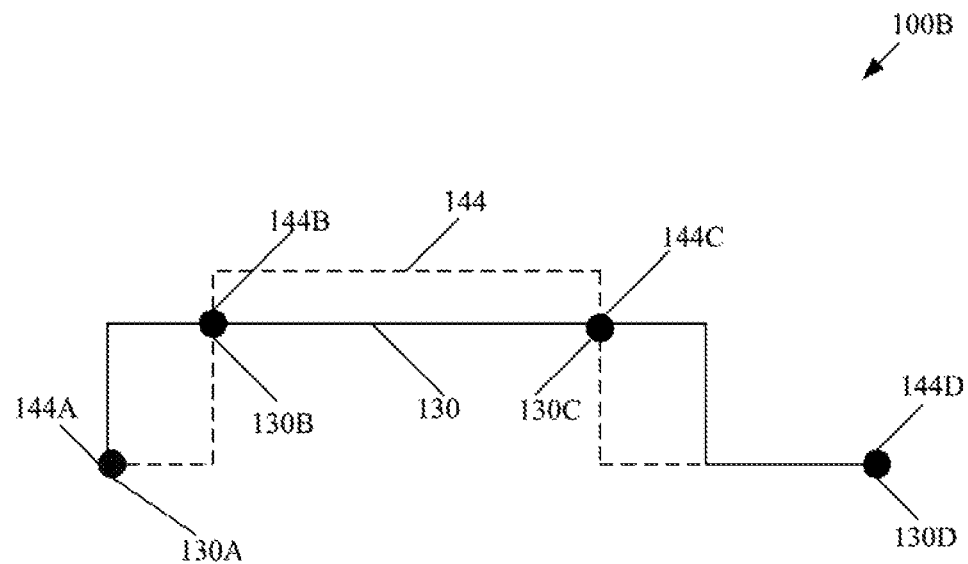
FIGS. 1B, 1C, and 1D illustrate exemplary scenarios for one or more route matching rules for automatic passenger sharing among vehicles, in accordance with an embodiment of the disclosure.
Figure 1C:
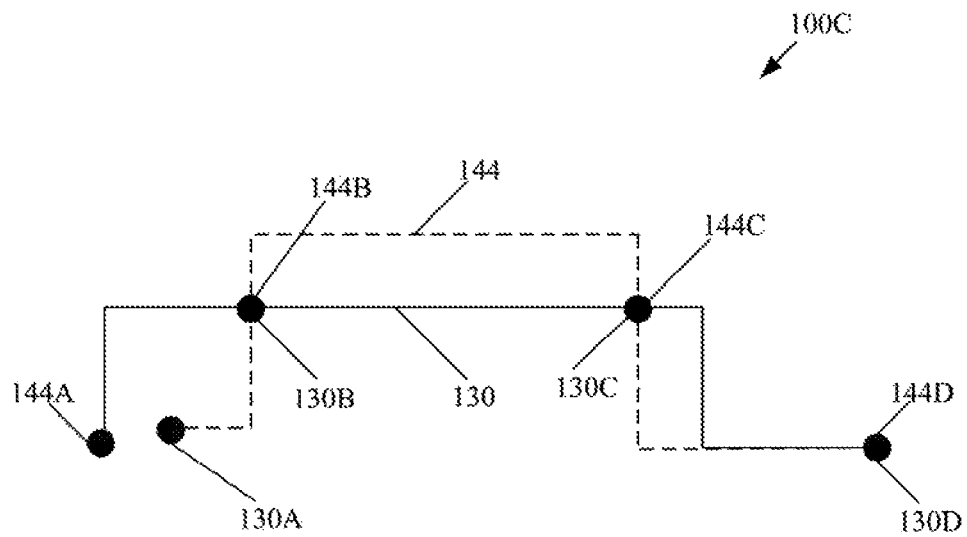
Figure 1D:
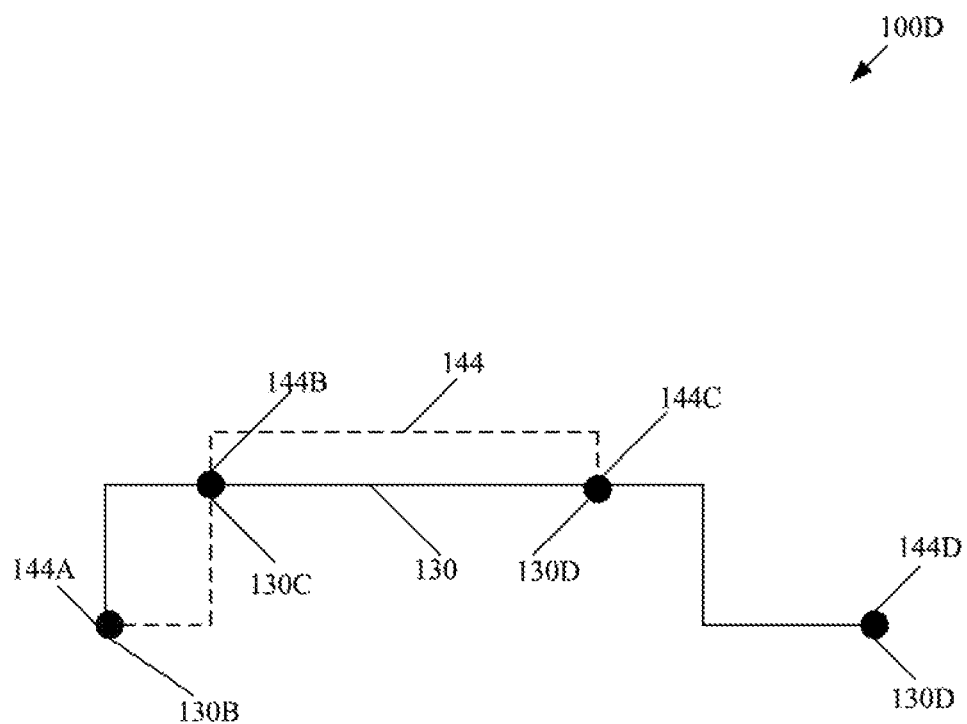

FIGS. 1B, 1C, and 1D illustrate exemplary scenarios for one or more route matching rules for automatic passenger sharing among vehicles, in accordance with an embodiment of the disclosure. FIGS. 1B, 1C, and 1D are explained in conjunction with elements from FIG. 1A. With reference to FIG. 1B, there is shown an exemplary scenario 100B that includes the first travel route 130 and the second travel route 144. The first travel route 130 is represented by a solid line and the second travel route 144 is represented by a dashed line. The first travel route 130 may include the source location 130A, the one or more intermediate transit locations 130B and 130C, and the destination location 130D. The second travel route 144 may include the source location 144A, the one or more intermediate transit locations 144B and 144C, and the destination location 144D.

In the exemplary scenario 100B, the first travel route 130 and the second travel route 144 are illustrated to be different with respect the path of the first travel route 130 and the second travel route 144. However, the source location 130A, the one or more intermediate transit locations 130B and 130C, and the destination location 130D of the first travel route 130 may coincide (or may be the same) with the source location 144A, the one or more intermediate transit locations 144B and 144C, and the destination location 144D of the second travel route 144. In some embodiments, the first travel route 130 and the second travel route 144 may be same with respect to source location, one or more intermediate transit locations, destination location and path followed.

The ECU 134 may compare the first route information of the first vehicle 102 with the second route information of the second vehicle 106. The first route information may include the details of the first travel route 130 of the first vehicle 102 and the second route information may include the details of the second travel route 144 of the second vehicle 106. The comparison between the first route information and the second route information may be in accordance with the one or more route matching rules. The one or more route matching rules may include the complete route match rule and the partial route match rule. The ECU 134 may be configured to check whether the first travel route 130 and the second travel route 144 satisfies the complete route match rule. In a scenario, if the first travel route 130 and the second travel route 144 satisfy the complete route match rule, the ECU 134 may establish the satisfaction of the one or more travel rules without checking for the satisfaction of the partial route match rule. Two travel routes may satisfy the complete route match rule if source location, one or more intermediate locations and destination locations of both the travel routes coincide. The path included in the two travel routes may be same or different.

The ECU 134 may determine that the first travel route 130 and the second travel route 144 (as illustrated in the exemplary scenario 100B) satisfy the complete match rule. The source location 130A, the one or more intermediate transit locations 130B and 130C, and the destination location 130D of the first travel route 130 coincide with the source location 144A, the one or more intermediate transit locations 144B and 144C, and the destination location 144D of the second travel route 144. Thus, the ECU 134 may not further check the partial route match rule and may establish that the one or more route matching rules are satisfied.

In some embodiments, the ECU 134 may determine that the complete route match rule is not satisfied by two travel routes. In this scenario, the ECU 134 may be configured to check whether the two travel routes satisfy the partial route match rule. The check performed by the ECU 134 to determine the satisfaction of partial route match rule is explained in FIGS. 1C and 1D.

With reference to FIG. 1C, there is shown another exemplary scenario 100C that includes the first travel route 130 and the second travel route 144. The first travel route 130 may include the source location 130A, the one or more intermediate transit locations 130B and 130C, and the destination location 130D. The second travel route 144 may include the source location 144A, the one or more intermediate transit locations 144B and 144C, and the destination location 144D. In the exemplary scenario 100C, the first travel route 130 and the second travel route 144 are illustrated to be different with respect to their source location. However, the destination location 130D of the first travel route 130 may coincide (or may be the same) with the destination location 144D of the second travel route 144. In this scenario, the ECU 134 may establish that the complete route match rule is not satisfied. Thus, the ECU 134 may compare the first route information and the second route information based on the partial route match rule.

A first condition to satisfy the partial route match rule is when two travel routes (such as a route "A" and a route "B") have a common destination location and at least one common intermediate transit location that is adjacent to the common destination location. The source location and other intermediate transit locations apart from the at least one common intermediate transit location of the route "A" and the route "B may be same or different. A second condition to satisfy the partial route match rule is when one of two travel routes (such as the route "A") is a portion (a small stretch/sub-route) of the other travel route (such as the route "B") and further a destination location of one of the two travel routes (i.e., the route "A") coincides (or may be the same) with an intermediate transit location of the other travel route (i.e., the route "B"). In other words, if at least one intermediate transit location adjacent to the destination location and the destination location of the route "A" coincide (or may be the same) with two adjacent intermediate transit locations of the route "B", the partial route match rule is satisfied. The source location and other intermediate transit locations apart from the at least one intermediate transit location adjacent to the destination location of the route "A" may be same or different from the route "B". The ECU 134 may establish that the partial route match rule is satisfied if one of the first condition or the second condition is fulfilled.

In the exemplary scenario 100C, the ECU 134 may determine that the destination location 130D of the first travel route 130 is same as that of the destination location 144D of the second travel route 144. Further, the intermediate transit locations 130B and 130C of the first travel route 130 coincide (or may be the same) with the intermediate transit locations 144B and 144C of the second travel route 144. Thus, the ECU 134 determines that the first travel route 130 and the second travel route 144 illustrated in the exemplary scenario 100C satisfies the partial route match rule based on the first condition of the partial route match rule and further establishes that the one or more route matching rules are satisfied.

With reference to FIG. 1D, there is shown another exemplary scenario 100D that includes the first travel route 130 and the second travel route 144. The first travel route 130 may include the source location 130B, the one or more intermediate transit locations 130C, and the destination location 130D. The second travel route 144 may include the source location 144A, the one or more intermediate transit locations 144B and 144C, and the destination location 144D. In the exemplary scenario 100D, the first travel route 130 and the second travel route 144 are different with respect to their final destination locations. However, the destination location 130D of the first travel route 130 coincides with the intermediate transit location 144C of the second travel route 144, the intermediate transit location 130C coincides with the intermediate transit location 144B, and the source location 130B coincides with the source location 144A. In some embodiments, the source location 130B may be different from the source location 144A.

In the exemplary scenario 100D, the ECU 134 may determine that the complete route match rule is not satisfied by the first travel route 130 and the second travel route 144. Thus, the ECU 134 may compare the first route information and the second route information based on the partial route match rule. The ECU 134 may further determine that the destination location 130D of the first travel route 130 is different from the destination location 144D of the second travel route 144. Thus, the first condition of the partial route match rule is also not fulfilled by the first travel route 130 and the second travel route 144. However, the ECU 134 may further determine that the destination location 130D coincides with the intermediate transit location 144C, the intermediate transit location 130C coincides with the intermediate transit location 144B, and the source location 130B coincides with the source location 144A. Thus, the first travel route 130 is a portion of the second travel route 144. Hence, the ECU 134 determines that the first travel route 130 and the second travel route 144 (as illustrated in the exemplary scenario 100D) satisfy the partial route match rule based on the second condition of the partial route match rule. The ECU 134 may further establish that the one or more route matching rules are satisfied based on the satisfaction of the partial route match rule.

In some embodiment, the source location 130B may be different from the source location 144A. However, the second condition of the partial route match rule is still fulfilled. Thus, the ECU 134 may determine that the first travel route 130 and the second travel route 144 satisfy the partial route match rule based on the second condition.

Figure 2:
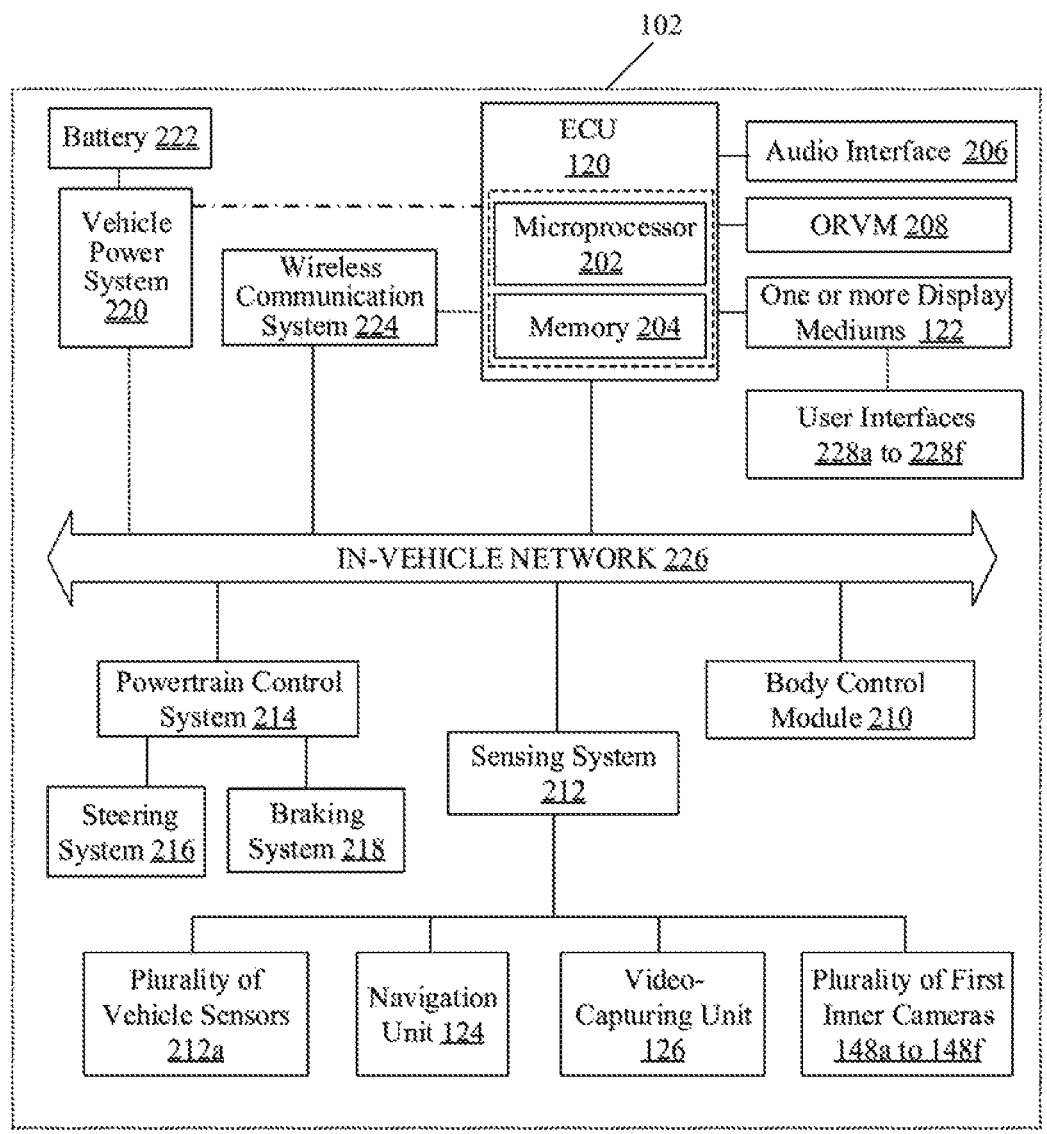
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1A. With reference to FIG. 2, there is shown the first vehicle 102. The first vehicle 102 may comprise the ECU 120 that may include a microprocessor 202 and a memory 204. The first vehicle 102 may further comprise an audio interface 206, an outside rear view mirror (ORVM) 208, and the one or more display mediums 122 communicatively coupled to the ECU 120. The first vehicle 102 may further comprise a body control module 210, a sensing system 212, and a powertrain control system 214. The sensing system 212 may include a plurality of vehicle sensors 212a, the navigation unit 124, the video-capturing unit 126, and the plurality of first inner cameras 148a to 148f (FIG. 1). The powertrain control system 214 may include a steering system 216 and a braking system 218. The first vehicle 102 may further comprise a vehicle power system 220, a battery 222, a wireless communication system 224, and an in-vehicle network 226. The one or more display mediums 122 may be associated with one or more user interfaces (UIs) 228a to 228d.

The various components or systems may be communicatively coupled via the in-vehicle network 226, such as a vehicle area network (VAN), and/or an in-vehicle data bus. The microprocessor 202 may be communicatively coupled to the audio interface 206, the one or more display mediums 122, the sensing system 212, and the wireless communication system 224. The microprocessor 202 may also be operatively connected with the body control module 210, the powertrain control system 214, the steering system 216, and the braking system 218. The wireless communication system 224 may be configured to communicate with one or more external devices, such as the first communication device 110 and the server 114 under the control of the microprocessor 202. A person ordinary skilled in the art will understand that the first vehicle 102 may also include other suitable components or systems, in addition to the components or systems which are illustrated herein to describe and explain the function and operation of the present disclosure.

The microprocessor 202 may comprise suitable logic, circuitry, interfaces, and/or code that may be configured to execute a set of instructions stored in the memory 204. The microprocessor 202 may be configured to communicate a vehicle sharing request to remaining plurality of vehicles (such as the second vehicle 106). In accordance with an embodiment, the microprocessor 202 may be configured to automatically control one or more components or systems, such as the powertrain control system 214, the steering system 216, the braking system 218, the sensing system 212, and/or the body control module 210 of the first vehicle 102, when the first vehicle 102 is in an autonomous operating mode. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine code and/or a set of instructions with at least one code section executable by the microprocessor 202. The memory 204 may store various types of information related to the first vehicle 102. Various types of information may include the first rout information, the first seat mapping information, and the first vehicle information related to the first vehicle 102. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), and/or CPU cache memory.

The audio interface 206 may be connected to a speaker, a chime, a buzzer, or other device that may be configured to generate a sound. The audio interface 206 may also be connected to a microphone or other device to receive a voice input from an occupant, such as the one or more first passengers 132a to 132c, of the first vehicle 102. The audio interface 206 may also be communicatively coupled to the microprocessor 202. The audio interface 206 may be a part of an in-vehicle infotainment (IVI) system or head unit of the first vehicle 102. The in-vehicle infotainment, for example, may include a combination of hardware devices and software that provides audio or video entertainment to occupants of a vehicle, such as the first vehicle 102. In accordance with an embodiment, the one or more display mediums 122 may also be communicatively coupled to the IVI system.

The body control module 210 may refer to another electronic control unit that comprises suitable logic, circuitry, interfaces, and/or code that may be configured to control various electronic components or systems of the first vehicle 102. The body control module 210 may be configured to receive a command from the microprocessor 202. The body control module 210 may relay the command to other suitable vehicle systems or components for access control of the first vehicle 102. For example, the body control module 210 may relay the command to automatically lock or open the door of the first vehicle 102.

The sensing system 212 may comprise the plurality of vehicle sensors 212a, the navigation unit 124, the video-capturing unit 126, and the plurality of first inner cameras 148a to 148f. The plurality of vehicle sensors 212a may include traffic condition detection sensors. The traffic condition detection sensors may also include a vehicle speed sensor and the video-capturing unit 126 installed on the vehicle body of the first vehicle 102. The sensing system 212 may be communicatively coupled to the microprocessor 202 to provide input signals to the microprocessor 202. For example, the sensing system 212 may be used to sense or detect the sensor data by use of the plurality of vehicle sensors 212a. Other examples of the plurality of vehicle sensors 212a, may include, but are not limited to a yaw rate sensor, a vehicle speed sensor, odometric sensors, a steering angle sensor, a vehicle travel direction detection sensor, a magnetometer, an image sensor, a touch sensor, an infrared sensor, and a depth sensor The powertrain control system 214 may refer to an onboard computer of the first vehicle 102 that controls operations of an engine and a transmission system of the first vehicle 102. The powertrain control system 214 may control ignition, fuel injection, emission systems, and/or operations of a transmission system (when provided) and the braking system 218.

The steering system 216 may be configured to receive one or more commands from the microprocessor 202. The steering system 216 may include a steering wheel and/or an electric motor (provided for a power-assisted steering) that may be used by the first user 128 to control movement of the first vehicle 102 in manual mode or a semi-autonomous mode. In accordance with an embodiment, the movement or steering of the first vehicle 102 may be automatically controlled when the first vehicle 102 is in autonomous mode. Examples of the steering system 216 may include, but are not limited to, an autonomous steering control, a power-assisted steering system, a vacuum/hydraulic-based steering system, an electro-hydraulic power-assisted system (EH-PAS), or a "steer-by-wire" system, or an autonomous steering system, known in the art.

The braking system 218 may be used to stop or slow down the first vehicle 102 by application of resistive forces such as electromagnetic and/or frictional forces. The braking system 218 may be configured to receive a command from the powertrain control system 214 under the control of the microprocessor 202, when the first vehicle 102 is in an autonomous mode or a semi-autonomous mode. In accordance with an embodiment, the braking system 218 may be configured to receive a command from the body control module 210 and/or the microprocessor 202 when the microprocessor 202 preemptively detects a steep curvature based on the set current travel route of the first vehicle 102, an obstacle, or other road hazards.

The vehicle power system 220 may regulate the charging and the power output of the battery 222 to various electric circuits and the loads of the first vehicle 102, as described above. When the first vehicle 102 is a hybrid vehicle or an autonomous vehicle, the vehicle power system 220 may provide the required voltage for all of the components and enable the first vehicle 102 to utilize the battery 222 power for a sufficient amount of time. In accordance with an embodiment, the vehicle power system 220 may correspond to power electronics, and may include a microcontroller that may be communicatively coupled (shown by dotted lines) to the in-vehicle network 226. In such an embodiment, the microcontroller may receive one or more commands from the powertrain control system 214 under the control of the microprocessor 202.

The battery 222 may be a source of electric power for one or more electric circuits or loads (not shown). For example, the loads may include, but are not limited to various lights or lighting systems, such as headlights and interior cabin lights, electrically powered adjustable components, such as vehicle seats, mirrors, windows or the like, and/or other in-vehicle infotainment system, such as radio, speakers, electronic navigation system, electrically controlled, powered and/or assisted steering, such as the steering system 216. The battery 222 may be a rechargeable battery. The battery 222 may be a source of electrical power to the ECU 120 (shown by dashed lines), the plurality of vehicle sensors 212a, the video-capturing unit 126, and the plurality of first inner cameras 148a to 148f of the sensing system 212, and/or other hardware units, such as the one or more display mediums 122. The battery 222 may be a source of electrical power to start an engine of the first vehicle 102 by selectively providing electric power to an ignition system (not shown) of the first vehicle 102.

The wireless communication system 224 may comprise suitable logic, circuitry, interfaces, and/or code that may be configured to communicate with other vehicles (such as the second vehicle 106) and/or one or more external devices (such as the first communication device 110) via the first wireless communication channel 116A, and one or more cloud servers, such as the server 114, via the wireless communication network 118. The wireless communication system 224 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The wireless communication system 224 may wirelessly communicate by use of various communication protocols of the first wireless communication channel 116A and the wireless communication network 118 (as described in FIG. 1).

The in-vehicle network 226 may include a medium through which the various control units, components, and/or systems of the first vehicle 102, such as the ECU 120, body control module 210, the sensing system 212, the powertrain control system 214, the wireless communication system 224, the audio interface 206, and the one or more display mediums 122, may communicate with each other. In accordance with an embodiment, in-vehicle communication of audio/video data for multimedia components may occur by use of Media Oriented Systems Transport (MOST) multimedia network protocol of the in-vehicle network 226 or other suitable networks for audio/video data communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle, such as the first vehicle 102. The in-vehicle network 226 may facilitate access control and/or communication between the microprocessor 202 (and the ECU 120) and other ECUs, such as a telematics control unit (TCU) of the first vehicle 102. Various devices or components in the first vehicle 102 may be configured to connect to the in-vehicle network 226, in accordance with various wired and wireless communication protocols. Examples of the wired and wireless communication protocols for the in-vehicle network 226 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The one or more UIs, such as the UIs 228a to 228f, may be rendered on the one or more display mediums 122, under the control of the microprocessor 202. The display of the first seat mapping information of the first vehicle 102 to the one or more first passengers 132a to 132c or the first user 128 may occur by use of the one or more UIs 228a to 228f.

The functions and/or operations performed by the ECU 120, as described in FIG. 1A, may be performed by the microprocessor 202. Other operations performed by the microprocessor 202, are further described, for example, in FIGS. 3A, 3B, 3C, 3D, and 3E.

FIGS. 3A to 3E illustrate exemplary scenarios for implementation of the disclosed system and method for automatic passenger sharing among vehicles, in accordance with an embodiment of the disclosure. FIGS. 3A to 3E are explained in conjunction with elements from FIGS. 1A to 1D, and 2.

Figure 3A:
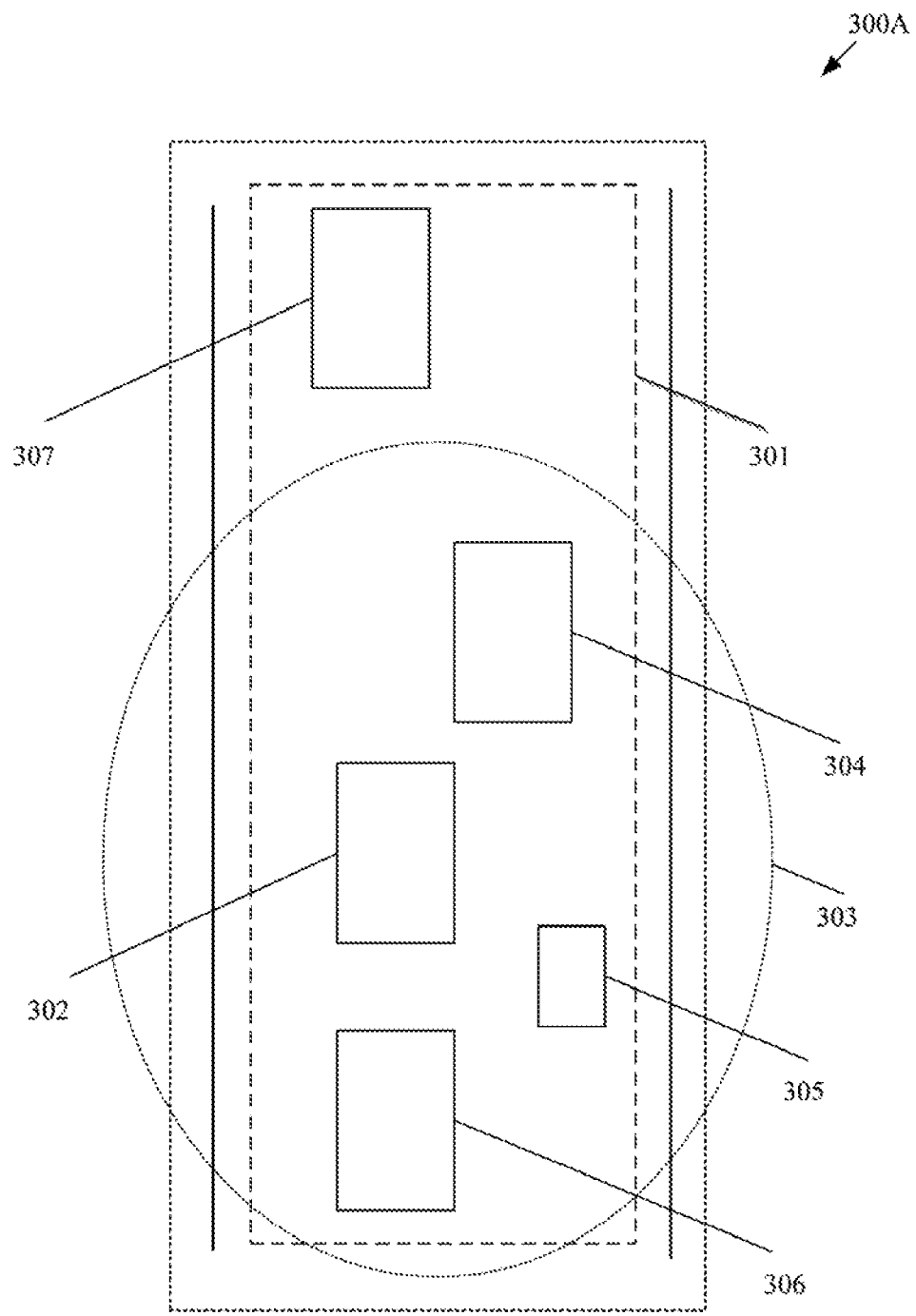
FIGS. 3A to 3E illustrate exemplary scenarios for implementation of the disclosed system and method for automatic passenger sharing among autonomous or semi-autonomous vehicles, in accordance with an embodiment of the disclosure.

With reference to FIG. 3A, there is shown an exemplary scenario 300A that includes a plurality of vehicles 301. The plurality of vehicles 301 includes a first bus 302 with a communication range 303, a second bus 304, a car 305, a third bus 306, and a fourth bus 307. In accordance with the exemplary scenario 300A, the plurality of vehicles 301 corresponds to the plurality of vehicles of FIG. 1A.

The second bus 304, the third bus 306, and the car 305 may be in the communication range 303 of the first bus 302. The fourth bus 307 may be out of the communication range 303 of the first bus 302. Thus, the first bus 302 may communicate with the second bus 304, the third bus 306, and the car 305 through V2V communication by use of the first wireless communication channel 116A. The first bus 302 may further communicate with the fourth bus 307 through V2C communication by use of the wireless communication network 118, if the fourth bus 307 and the first bus 302 are associated with same travel group. In some embodiments, the fourth bus 307 and the first bus 302 may not be associated with the same travel group. In such a scenario, the first bus 302 may communicate with the fourth bus 307 through the first communication device 110 (e.g., an RSU) and the second communication device 112 (e.g., an RSU).

Figure 3B:
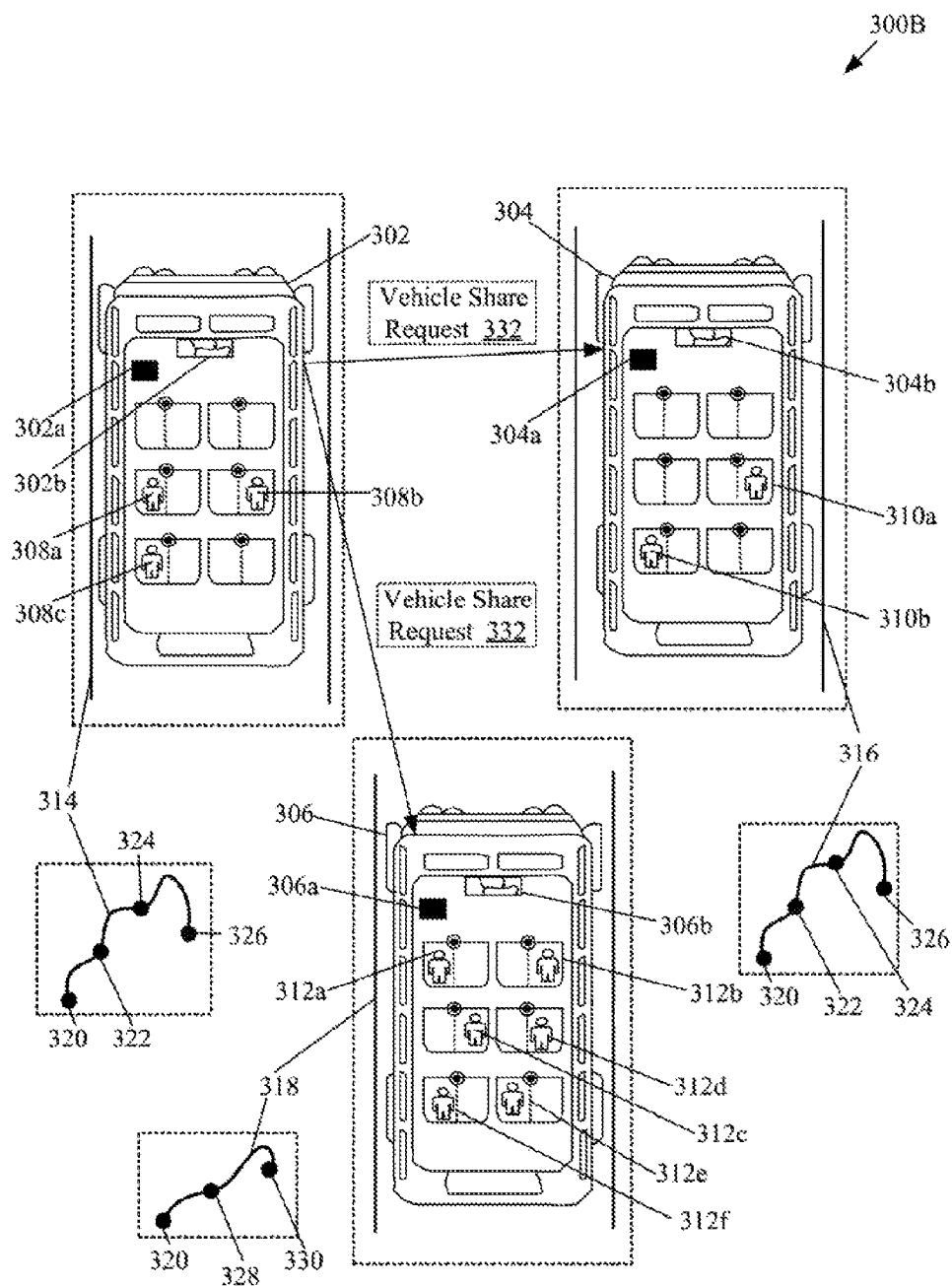

With reference to FIG. 3B, there is shown an exemplary scenario 300B that includes the first bus 302, the second bus 304, and the third bus 306. There is further shown, a first ECU 302a and a first navigation unit 302b provided in the first bus 302, a second ECU 304a and a second navigation unit 304b provided in the second bus 304, and a third ECU 306a and a third navigation unit 306b provided in the third bus 306. There is also shown a first set of passengers 308a to 308c, a second set of passengers 310a and 310b, and a third set of passengers 312a to 312f seated in the first bus 302, the second bus 304, and the third bus 306, respectively. There is further shown a first travel route 314 to be taken by the first bus 302, a second travel route 316 to be taken by the second bus 304, and a third travel route 318 to be taken by the third bus 306. The first travel route 314 may include a source location 320, a first set of intermediate transit locations 322 and 324, and a destination location 326. The second travel route 316 may include the source location 320, the first set of intermediate transit locations 322 and 324, and the destination location 326. The third travel route 318 may include the source location 320, a second set of intermediate transit location 328, and a destination location 330. There is further shown a vehicle sharing request 332 communicated by the first bus 302 to the remaining vehicles of the plurality of vehicles 301. The plurality of vehicles 301 may be at the location 320 at current time instant. A person having ordinary skill in the art will understand that the plurality of vehicles 301 may include all the elements included by the first vehicle 102 and the second vehicle 106 as described in FIG. 2.

The first ECU 302a of the first bus 302 may retrieve various types of information related to the first bus 302. The various types of information may include first route information, first seat mapping information, and first vehicle information associated with the first bus 302. The first ECU 302a may retrieve the first route information of the first bus 302 from the first navigation unit 302b. The first route information may include details of the first travel route 314 of the first bus 302. The details may include the source location 320, one or more intermediate transit locations 322 and 324, and a destination location 326 of the first travel route 314. The first ECU 302a may determine the first seat mapping information based on one or more images and/or videos captured by cameras (such as the plurality of first inner cameras 148a to 148f) installed in the first bus 302. The first seat mapping information as determined by the first ECU 302a may include a count of vacant seats, a count of occupied seats, a count of passengers, seat booking details, seat identification numbers of a plurality of seats in the first bus 302, or demographic details of passengers in the first bus 302. Table 1, shown below, illustrates the first seat mapping information as determined by the first ECU 302a.

TABLE 1

First seat mapping information of the first bus 302
First seat mapping information

| | |
|---|---|
| Count of vacant seats | 9 |
| Count of occupied seats | 3 |
| Count of passengers | 3 |
| Seat booking details | (308a: b190, S_5), (308b: b195, S_8), and (308c: b198, S_9) |
| Seat identification numbers of a plurality of seats | S_1, S_2, S_3, S_4, S_5, S_6, S_7, S_8, S_9, S_10, S_11, S_12 |
| Demographic details of passengers | (308a: Female, 23), (308b: Male, 50), and (308c: Male, 23) |

With reference to Table 1, the seat booking details may correspond to the booking id and allotted seat identification number of each of the a first set of passengers 308a to 308c. For example, the booking id of the first passengers 308a is "b190" and the allotted seat identification number is "S_5". The demographic details of passengers may correspond to gender and age of each of the first set of passengers 308a to 308c. For example, the gender of the first passengers 308a is "Female" and age is "23 years".

The first ECU 302a may further retrieve the first vehicle information of the first bus 302 from a memory device of the first ECU 302a. The first vehicle information includes a vehicle identification number, a vehicle type, and/or details of window seats in the first bus 302. Table 2, shown below, illustrates the first vehicle information of the first bus 302.

TABLE 2

First vehicle information of the first bus 302
First vehicle information

| | |
|---|---|
| Vehicle identification number | B-234 |
| Vehicle type | full-sleeper and non-air-conditioned |
| Details of window seats | S_1, S_4, S_5, S_8, S_9, S_12 |

With reference to Table 2, the details of window seats may include a seat identification number of the window seats in the first bus 302. The first ECU 302a may communicate the vehicle sharing request 332 to remaining of the plurality of vehicles 301, if the pool flag in the first ECU 302a is set to "1". In other words, if the first ECU 302a opts to share passengers among the remaining of the plurality of vehicles 301, the first ECU 302a may communicate the vehicle sharing request 332 to remaining of the plurality of vehicles 301. In this scenario, the first bus 302 may correspond to a transmitting vehicle. The vehicle sharing request 332 may include the first route information, the first seat mapping information, and the first vehicle information. The vehicle sharing request 332 may be received by the remaining vehicles of the plurality of vehicles 301 that are in the communication range 303 of the first bus 302. The second bus 304, the car 305, and the third bus 306 may be in the communication range of the first bus 302 and the fourth bus 307 (associated with a different travel group from the first bus 302) may be out of the communication range 303 of the first bus 302. The second bus 304, the car 305, and the third bus 306 may receive the vehicle sharing request 332. However, the pool flag of the car 305 may be set to "0", due to the absence of vacant seats. Thus, the vehicle sharing request 332 may be discarded by the car 305.

The second ECU 304a and the third ECU 306a may retrieve various types of information related to the second bus 304 and the third bus 306, respectively, based on the reception of the vehicle sharing request 332. The various types of information related to the second bus 304 may include second route information, second seat mapping information, and second vehicle information. Table 3, shown below, illustrates the second seat mapping information as determined by the second ECU 304a.

TABLE 3

Second seat mapping information of the second bus 304
Second seat mapping information

| | |
|---|---|
| Count of vacant seats | 10 |
| Count of occupied seats | 2 |
| Count of passengers | 2 |
| Seat booking details | (310a: b156, P_8) and (310b: b159, P_9) |
| Seat identification numbers of a plurality of seats | P_1, P_2, P_3, P_4, P_5, P_6, P_7, P_8, P_9, P_10, P_11, P_12 |
| Demographic details of passengers | (310a: Male, 23) and (310b: Female, 50) |

The various types of information related to the third bus 306 may include third route information, third seat mapping information, and third vehicle information. Table 4, shown below, illustrates the third seat mapping information as determined by the third ECU 306a.

TABLE 4

Third seat mapping information of the third bus 306
Third seat mapping information

| | |
|---|---|
| Count of vacant seats | 6 |
| Count of occupied seats | 6 |
| Count of passengers | 6 |
| Seat booking details | (312a: b203, R_1), (312b: b208, R_4), (312c: b214, R_6), (312d: b218, R_8), (312e: b225, R_9), and (312f: b232, R_11) |
| Seat identification numbers of a plurality of seats | R_1, R_2, R_3, R_4, R_5, R_6, R_7, R_8, R_9, R_10, R_11, R_12 |
| Demographic details of passengers | (312a: Female, 45), (312b: Female, 28), (312c: Male, 22), (312d: Male, 32), (312e: Female, 23), and (312f: Female, 19) |

The second ECU 304a may compare the first route information and the first seat mapping information included in the received vehicle sharing request 332 with the second route information and the second seat mapping information, respectively. Similarly, the third ECU 306a may compare the first route information and the first seat mapping information included in the received vehicle sharing request 332 with the third route information and the third seat mapping information, respectively.

The third ECU 306a may determine that the one or more route matching rules are not satisfied based on the comparison of the first route information with the third route information. The third travel route 318 includes the source location 320, the intermediate transit location 328, and the destination location 330. Thus, the third travel route 318 does not satisfy either of the complete route match rule and the partial route match rule. The third ECU 306a may therefore discard the vehicle sharing request 332.

The second ECU 304a may establish that the route matching rules are satisfied based on the comparison of the first route information with the second route information. The second travel route 316 includes the source location 320, the one or more intermediate transit locations 322 and 324, and the destination location 326 which are same as that of the first travel route 314 of the first bus 302. The second ECU 304a may further check whether the first vehicle information matches the second vehicle information. For instance, the second ECU 304a may determine that the vehicle type (i.e., "full-sleeper" and "non-air-conditioned") of the second bus 304 matches the vehicle type (i.e., "full-sleeper" and "non-air-conditioned") of the first bus 302. The second ECU 304a may further determine that the first set of passengers 308a to 308c may be accommodated in the second bus 304 along with the second set of passengers 310a and 310b without violating the one or more seat mapping rules. For instance, the first set of passengers 308a, 308b, and 308c may have specified to occupy window seats. The second bus 304 has at least three vacant window seats, such as P_1, P_4, and P_5 to accommodate the first set of passengers 308a, 308b, and 308c. Thus, the one or more seat mapping rules are satisfied. The second ECU 304a may further determine that the second set of passengers 310a to 310b may be accommodated in the first bus 302 along with the first set of passengers 308a to 308c without violating the one or more seat mapping rules. For example, the second set of passengers 310a and 310b may have specified to occupy window seats. The first bus 302 has at least two vacant window seats, such as S_1 and S_4 to accommodate the second set of passengers 310a and 310b. Thus, the second ECU 304a may establish that the one or more seat mapping rules are satisfied by the first bus 302 and the second bus 304.

Figure 3C:
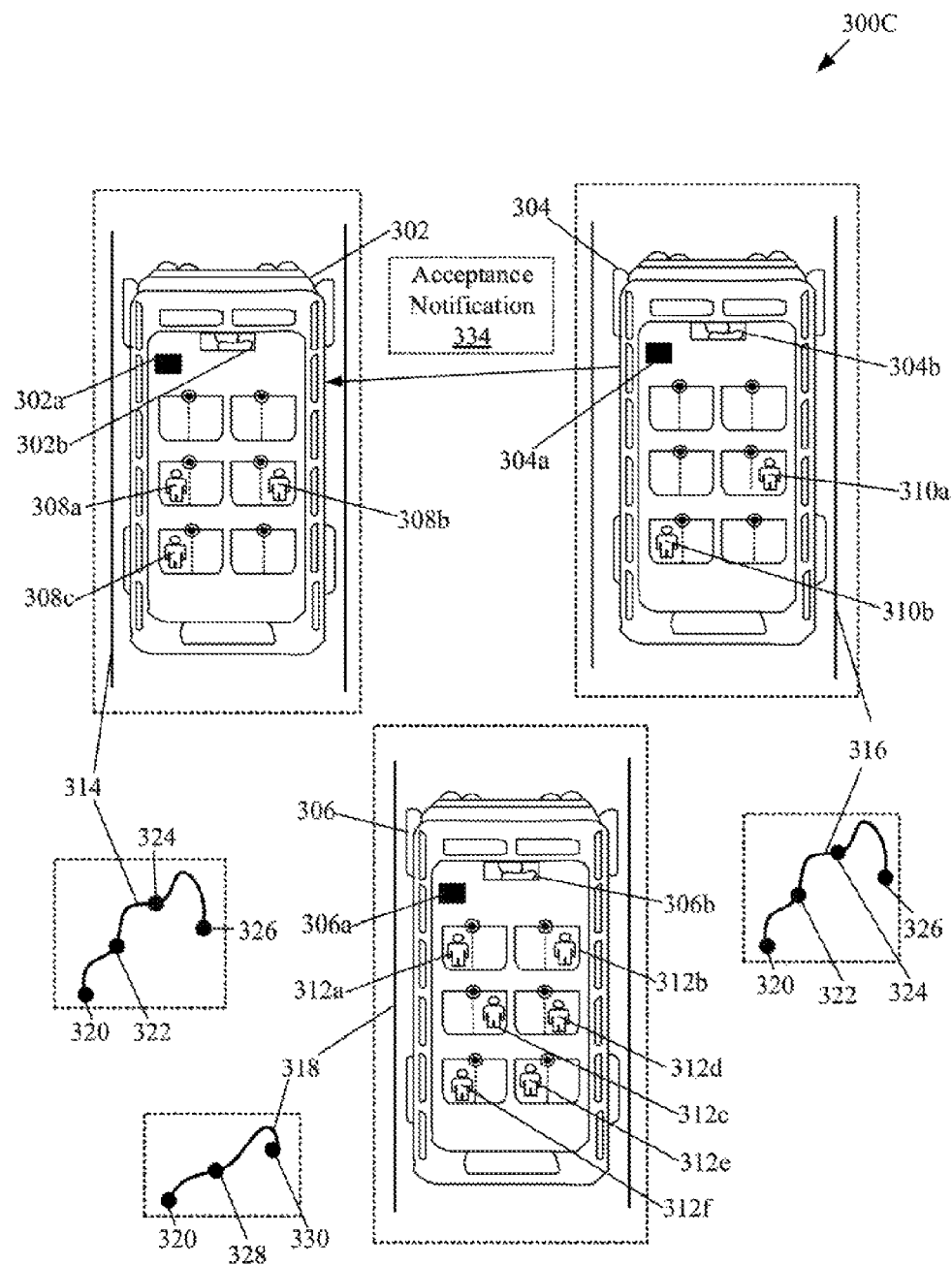

With reference to FIG. 3C, there is shown an exemplary scenario 300C that includes the first bus 302, the second bus 304, and the third bus 306. There is further shown, the first ECU 302a and the first navigation unit 302b provided in the first bus 302, the second ECU 304a and the second navigation unit 304b provided in the second bus 304, and the third ECU 306a and the third navigation unit 306b provided in the third bus 306. There is also shown the first set of passengers 308a to 308c, the second set of passengers 310a and 310b, the third set of passengers 312a to 312f, the first travel route 314, the second travel route 316, the third travel route 318. There is further shown an acceptance notification 334 communicated by the second bus 304.

The second ECU 304a may transmit the acceptance notification 334 to the first bus 302 based on the satisfaction of the one or more route matching rules and the one or more seat mapping rules (described in FIG. 3B), and a match of the first vehicle information with the second vehicle information. The second ECU 304a may further communicate the first vehicle information, the second vehicle information, and the second seat mapping information to the first bus 302 along with the acceptance notification 334. The first ECU 302a may receive the acceptance notification 334. For instance, the first ECU 302a may further receive other acceptance notifications from other vehicles, for example, the fourth bus 307. The first ECU 302a may discard the acceptance notifications that do not include the first vehicle information. The first ECU 302a may identify a vehicle (such as the second bus 304) for sharing passengers based on the acceptance notification 334 and the other acceptance notifications. For example, the first ECU 302a may identify that the second bus 304 satisfies the complete route match rule instead of another bus, for example, the fourth bus 307, for which only the partial route match rule is satisfied. Thus, the first ECU 302a may identify the second bus 304 to share passengers instead of the fourth bus 307. In some embodiments, the first ECU 302a may identify that the second bus 304 has a larger count of passengers in comparison to other buses for example, the fourth bus 307, from which the acceptance notifications are received. Thus, the first ECU 302a may identify the second bus 304 to share passengers instead of the fourth bus 307.

The first ECU 302a may be further configured to select a target vehicle from the first bus 302 or the identified second bus 304 to allow the first set of passengers 308a to 308c of the first bus 302 and the second set of passengers 310a and 310b of the second bus 304 to share travel in the selected target vehicle. The first ECU 302a may select the target vehicle based on the one or more selection parameters. The one or more selection parameters may comprise the travel route parameter, the passenger count parameter, and the seat mapping parameter.

The first ECU 302a may determine that the first bus 302 and the second bus 304 satisfies the complete route match rule and the one or more seat mapping rules are satisfied. The first ECU 302a may further determine that the first bus 302 has larger count of passengers in comparison to the second bus 304. Thus, the first ECU 302a may select the first bus 302 as the target vehicle in accordance with the passenger count parameter.

Figure 3D:
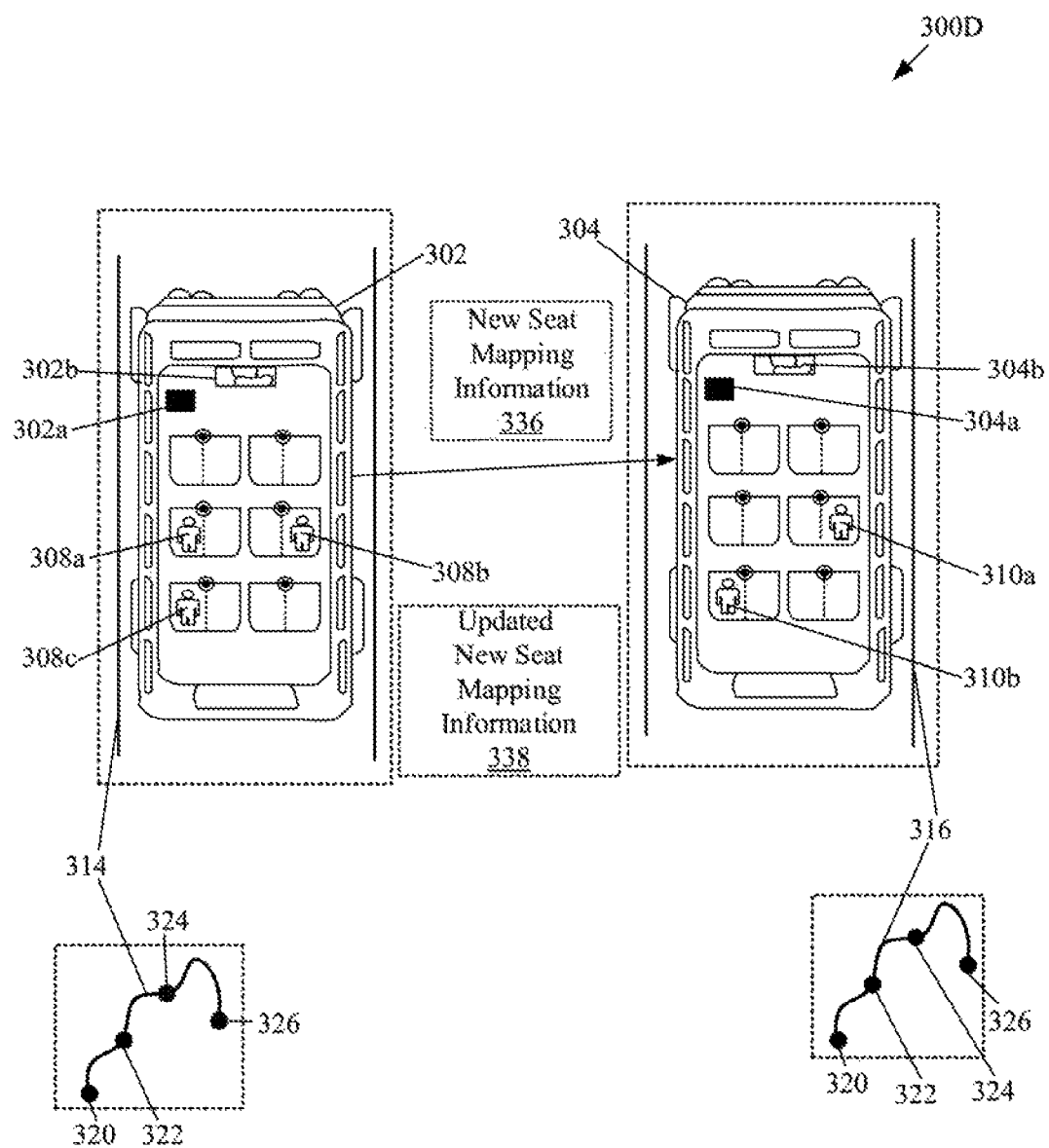

With reference to FIG. 3D, there is shown an exemplary scenario 300D that includes the first bus 302 and the second bus 304. There is further shown, the first ECU 302a and the first navigation unit 302b provided in the first bus 302, and the second ECU 304a and the second navigation unit 304b provided in the second bus 304. There is also shown the first set of passengers 308a to 308c, the second set of passengers 310a and 310b, the first travel route 314, and the second travel route 316. There is further shown new seat mapping information 336 communicated by the first bus 302, and updated new seat mapping information 338.

The first ECU 302a may generate the new seat mapping information 336 considering both the first set of passengers 308a to 308c and the second set of passengers 310a and 310b that are to be accommodated into the selected target vehicle (i.e., the first bus 302) for sharing travel. The first ECU 302a may generate the new seat mapping information 336 in accordance with the one or more seat mapping rules of the selected target vehicle (i.e., the first bus 302). Table 5 shown below illustrates the new seat mapping information 336 as determined by the first ECU 302a.

TABLE 5

New seat mapping information of the selected target vehicle (i.e., the first bus 302)
New seat mapping information

| | |
|---|---|
| Count of vacant seats | 7 |
| Count of occupied seats | 5 |
| Count of passengers | 5 |
| Seat booking details | (308a: b190, S_5), (308b: b195, S_8), (308c: b198, S_9), (310a: b156, S_1), and (310b: b159, S_4) |
| Seat identification numbers of a plurality of seats | S_1, S_2, S_3, S_4, S_5, S_6, S_7, S_8, S_9, S_10, S_11, S_12 |
| Demographic details of passengers | (308a: Female, 23), (308b: Male, 50), (308c: Male, 23), (310a: Male, 23), and (310b: Female, 50) |

With reference to Table 5, the one or more second passengers 310a and 310b are allotted seats (such as S_1 and S_4, respectively) in the target vehicle (i.e., the first bus 302) The new seat mapping information 336 corresponds to updated information related to one or more of count of vacant seats, count of occupied seats, count of passengers, seat booking details, seat identification numbers of a plurality of seats, or demographic details of passengers depending on the accommodation of the first set of passengers 308a to 308c and the second set of passengers 310a and 310b into a common vehicle, such as the first bus 302 in this case, for shared travel.

The first ECU 302a may further communicate the new seat mapping information 336 to the second bus 304. The first ECU 302a may further communicate the first vehicle information and the second vehicle information along with the new seat mapping information 336 to remaining vehicles of the plurality of vehicles 301 periodically so that remaining vacant seats may also be optimally utilized.

Figure 3E:
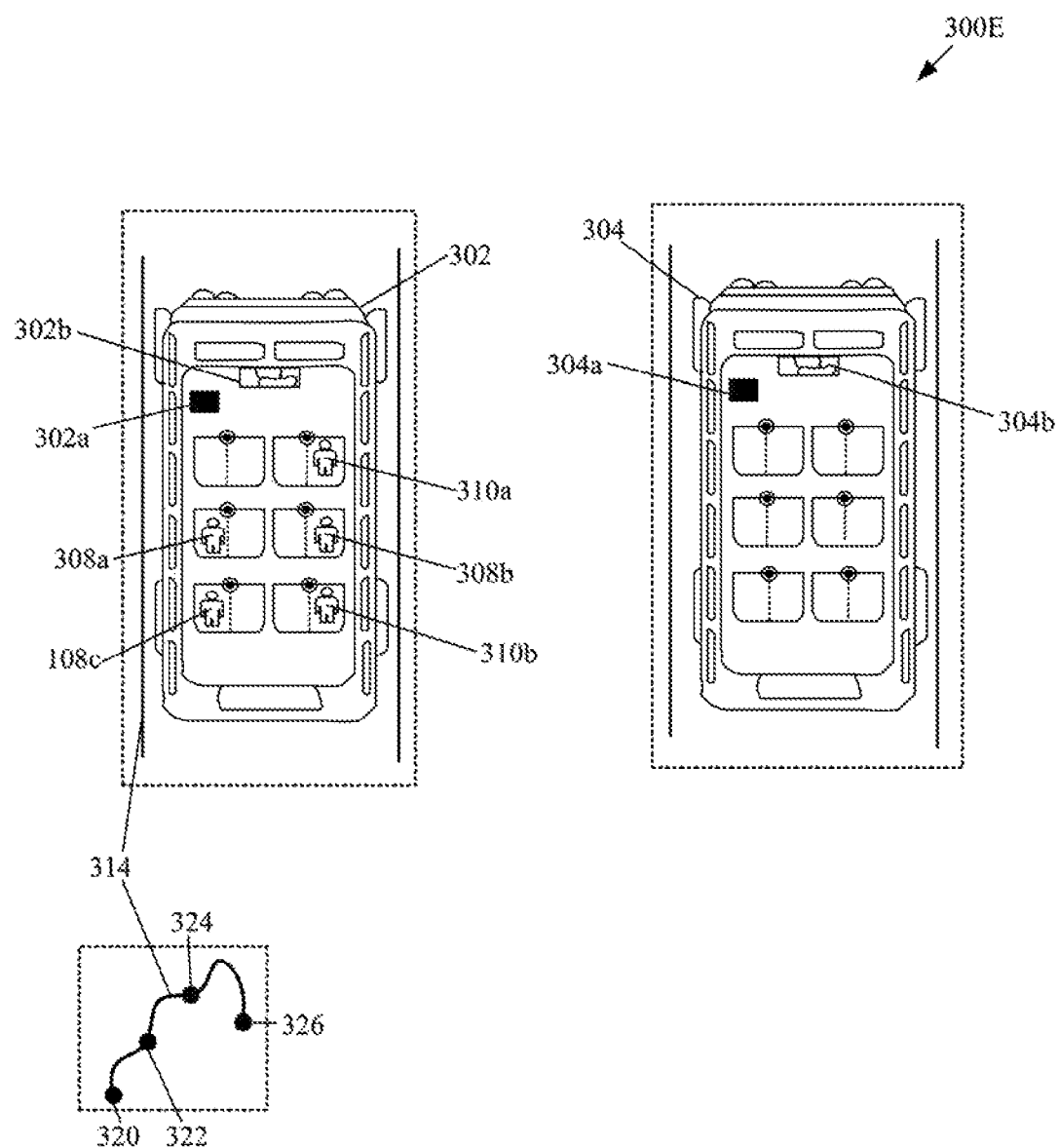

With reference to FIG. 3E, there is shown an exemplary scenario 300E that includes the first bus 302 and the second bus 304. There is further shown, the first ECU 302a and the first navigation unit 302b provided in the first bus 302, and the second ECU 304a and the second navigation unit 304b provided in the second bus 304. There is also shown the first set of passengers 308a to 308c, the second set of passengers 310a and 310b, and the first travel route 314.

The first ECU 302a may be configured to detect a next intermediate transit location (for example, the intermediate transit location 322) that is common to the first travel route 314 and the second travel route 316 of the first bus 302 and the second bus 304, respectively. For example, at a current time instant the first bus 302 may have started the travel from the source location 320 in the first travel route 314. At the current time instant, the second bus 304 may have travelled "1 km" towards the intermediate transit location 322 from the source location 320 in the second travel route 316. Thus, the first ECU 302a may detect that the next intermediate transit location that is common to the first travel route 314 and the second travel route 316 of the first bus 302 and the second bus 304 is the intermediate transit location 322. Thereafter, the first ECU 302a may be configured to communicate a halt instruction to a powertrain control system, via an in-vehicle network of the first bus 302 to stop the first bus 302 at the detected next intermediate transit location 322. Similarly, the first ECU 302a may communicate an instruction to the second bus 304 to synchronize stoppage of the second bus 304 with the first bus 302 at the detected next intermediate transit location 322. In some embodiment, the second ECU 304a may concurrently detect the next intermediate transit that is common to the first travel route 314 and the second travel route 316 of the first bus 302 and the second bus 304, respectively. In such as case, the second ECU 304a may also communicate a halt instruction via an in-vehicle network of the second bus 304 to stop the second bus 304 at the detected next intermediate transit location. In certain scenarios, where the first bus 302 or the second bus 304 may not be autonomous vehicles. In such scenarios, a recommendation may be generated for the driver of the respective buses to stop at the detected next intermediate transit location 322 that is common to both the first bus 302 and the second bus 304. Thus, the first bus 302 and the second bus 304 may be stopped at the next intermediate transit location 322 that is common to the first travel route 314 and the second travel route 316 of the first bus 302 and the second bus 304, respectively.

The second set of passengers 310a and 310b may be transferred to the first bus 302 at the intermediate transit location 322. The second set of passengers 310a and 310b may be seated in the first bus 302 along with the first set of passengers 308a to 308c. The first set of passengers 308a to 308c and the second set of passengers 310a and 310b may share the remaining travel, which is from the intermediate transit location 322 to the destination location 326 in the first bus 302. The second bus 304 may remain stopped at the intermediate transit location "b" until a new travel route is generated for the second bus 304.

In some embodiments, the second set of passengers 310a and 310b may be seated in the first bus 302 along with the first set of passengers 308a to 308c in accordance with the new seat mapping information 336. In such embodiments, before actual transfer of passengers from one vehicle to another, the new seat mapping information 336 may be presented to the first set of passengers 308a to 308c and the second set of passengers 310a and 310b through various user interfaces (for example, the UIs 228a to 228f) rendered on one or more display mediums (such as the one or more display mediums 122 and 136) provided in the first bus 302 and the second bus 304, respectively. The first set of passengers 308a to 308c and the second set of passengers 310a and 310b may provide feedback for the new seat mapping information 336 by selection of one or more graphical buttons (not shown) rendered on the one or more display mediums. For example, the second passenger 310a may not want to be seated at a front seat of the first bus 302 and thus may not approve (disapprove) the new seat mapping information 336. In this scenario, the first ECU 302a may update the new seat mapping information 336 based on the feedback provided by the first set of passengers 308a to 308c and the second set of passengers 310a and 310b. For example, in the updated new seat mapping information 338 (this refers to an update in the new seat mapping information 336), the second passenger 310a may be assigned the seat with seat identification number "S_12". The first ECU 302a may further communicate the updated new seat mapping information 338 to the second bus 304.

In some embodiments, the first bus 302 at certain time instances may also act or operate as a recipient of vehicle sharing request 332 (in addition to transmitter of the vehicle sharing request 332) from the remaining vehicles of the plurality of vehicles 301. In such embodiments, the first ECU 302a may receive the vehicle sharing request 332 and communicate the acceptance notification 334. In some embodiments, the first ECU 302a may further communicate another vehicle sharing request periodically to utilize the remaining vacant seats in the first bus 302 until no vacant seat remains in the first bus 302.

Figure 4A:
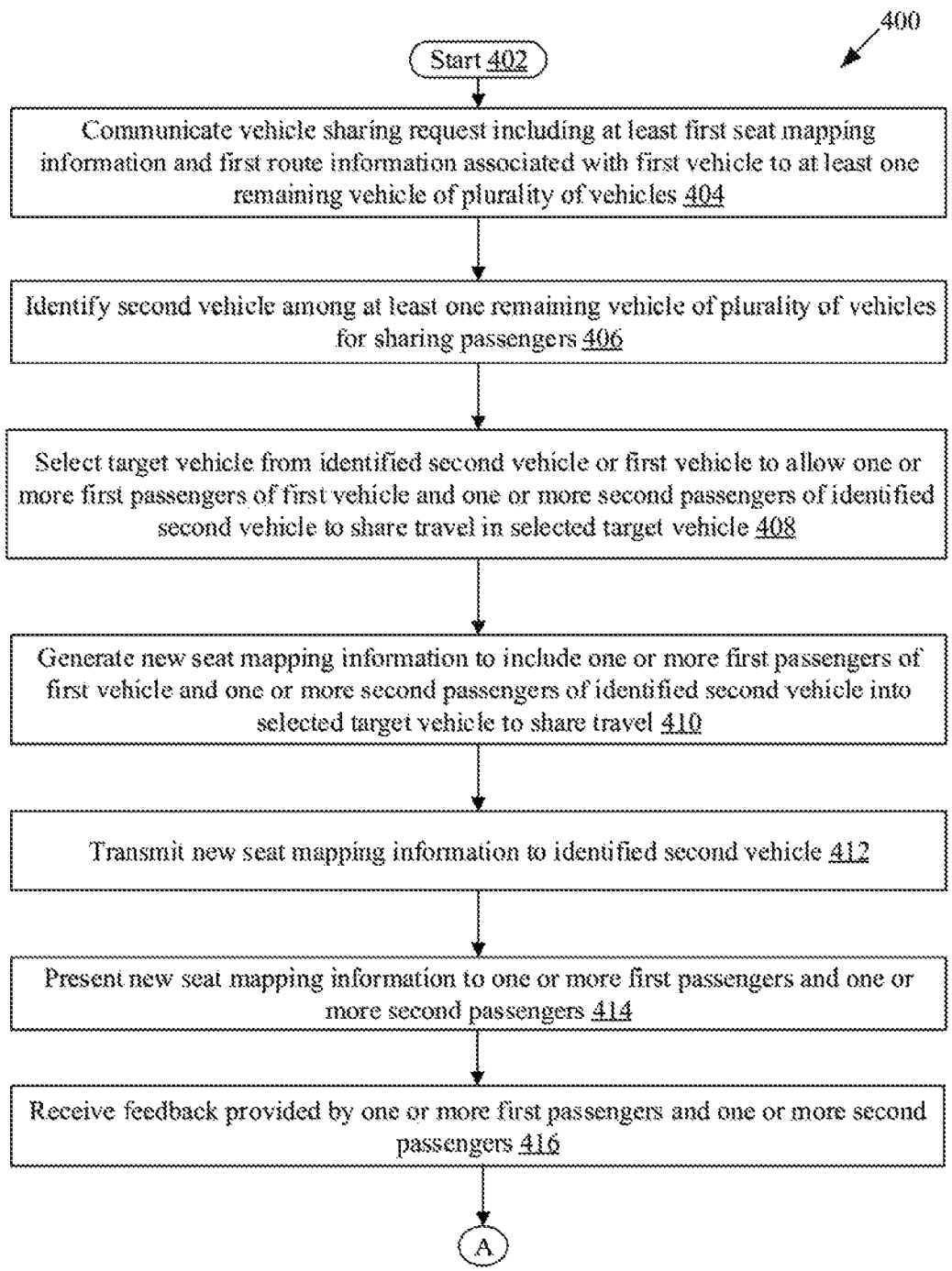
FIGS. 4A and 4B collectively, depict a first flow chart that illustrates exemplary operations for automatic passenger sharing among vehicles, in accordance with an embodiment of the disclosure.
Figure 4B:
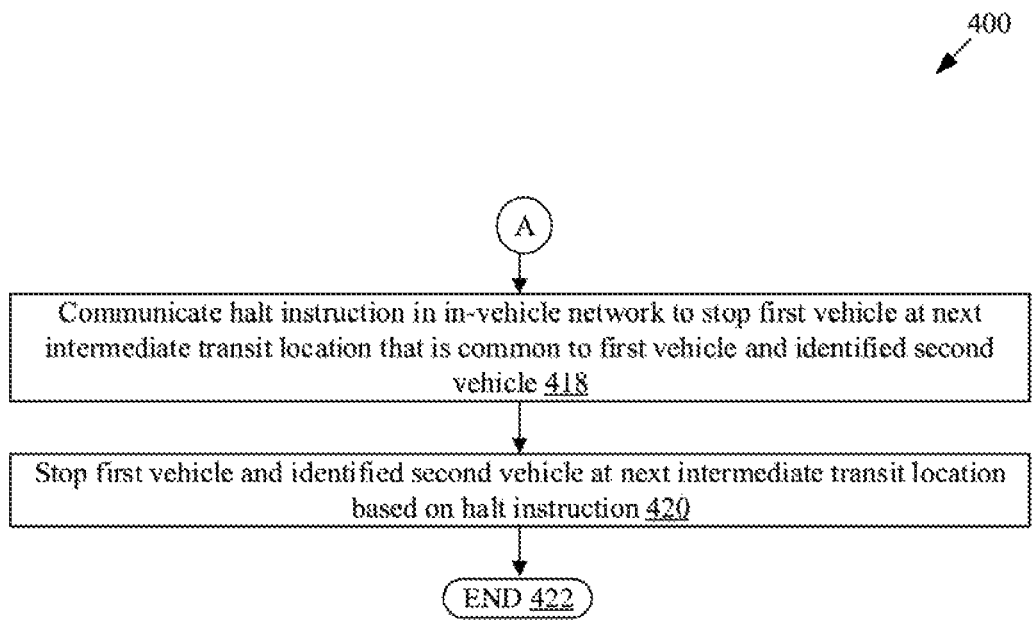

FIGS. 4A and 4B, collectively, depict a first flow chart that illustrates a first exemplary method for facilitating automatic passenger sharing among autonomous vehicles or semi-autonomous vehicles, in accordance with an embodiment of the disclosure. With reference to FIGS. 4A and 4B, there is shown a flowchart 400. The first flow chart 400 is described in conjunction with FIGS. 1A, 1B, 1C, 1D, 2, 3A, 3B, 3C, 3D, and 3E. The operations, implemented at the ECU 120 for facilitating automatic passenger sharing among autonomous vehicles or semi-autonomous vehicles, begin at 402 and proceed to 404.

At 404, a vehicle sharing request including at least first seat mapping information and first route information associated with a first vehicle may be communicated to at least one remaining vehicle of a plurality of vehicles. The ECU 120 may be configured to communicate the vehicle sharing request including at least the first seat mapping information and the first route information associated with the first vehicle may be communicated to at least one remaining vehicle of the plurality of vehicles. The vehicle sharing request may further include first vehicle information of the first vehicle. An example is shown and described in FIG. 3A, where the first ECU 302a retrieves the first route information, the first seat mapping information, and the first vehicle information of the first bus 302. The first ECU 302a further communicates the vehicle sharing request 332 to the plurality of vehicles 301.

At 406, a second vehicle among the at least one remaining vehicle of the plurality of vehicles may be identified for sharing passengers. The ECU 120 may be configured to identify the second vehicle among the at least one remaining vehicle of the plurality of vehicles for sharing passengers. The identification of the second vehicle may be based on the comparison of the first route information and the first seat mapping information with second route information and second seat mapping information received from the at least one remaining vehicle of the plurality of vehicles. The identification of the second vehicle may be further based on an acceptance notification received from the at least one remaining vehicle of the plurality of vehicles. An example is shown and described in FIGS. 3A and 3B, where the first ECU 302a identifies the second bus 304 as the second vehicle for sharing passengers based on the acceptance notification 334. The second ECU 304a may communicate the acceptance notification 334 based on the comparison of the first route information and the first seat mapping information with second route information and second seat mapping information.

At 408, a target vehicle may be selected from the identified second vehicle or the first vehicle to allow one or more first passengers of the first vehicle and one or more second passengers of the identified second vehicle to share travel in the selected target vehicle. The ECU 120 may be configured to select the target vehicle from the identified second vehicle or the first vehicle. The selection of the target vehicle from the identified second vehicle or the first vehicle may be based on the one or more selection parameters, such as the travel route parameter, the passenger count parameter, and the seat mapping parameter. An example is shown and described in FIGS. 3A, 3B, 3C, and 3D, where the first ECU 302a selects the first bus 302 as the target vehicle to allow the first set of passengers 308a to 308c of the first bus 302 and the second set of passengers 310a and 310b of the identified second bus 304 to share travel in the selected target vehicle.

At 410, new seat mapping information may be generated to include the one or more first passengers of the first vehicle and the one or more second passengers of the identified second vehicle into the selected target vehicle to share travel. The ECU 120 may be configured to generate the new seat mapping information for the selected target vehicle to include the one or more first passengers and the one or more second passengers into the selected target vehicle to share travel. An example is shown and described in FIGS. 3A, 3B, and 3C, where the first ECU 302a generates the new seat mapping information 336 for the selected target vehicle (i.e., the first bus 302) to include the first set of passengers 308a to 308c and the second set of passengers 310a and 310b into the first bus 302 to share travel.

At 412, the new seat mapping information may be transmitted to the identified second vehicle. The ECU 120 may be configured to transmit the new seat mapping information to the identified second vehicle. The first vehicle information and the second vehicle information may also be transmitted to the identified second vehicle along with the new seat mapping information. The ECU 120 may transmit the new seat mapping information to the identified second vehicle via V2V communication. For instance, the identified second vehicle may go out of reach of the communication range of the ECU 120. In such a case, the ECU 120 may transmit the new seat mapping information to the identified second vehicle via V2C communication, when the first vehicle and the second vehicle are associated with a same travel group. An example is shown and described in FIGS. 3A, 3B, and 3C, where the first ECU 302a transmits the new seat mapping information 336 to the second bus 304 (i.e., the identified second vehicle).

At 414, the new seat mapping information may be presented to the one or more first passengers and the one or more second passengers. The ECU 120 may be configured to present the new seat mapping information to the one or more first passengers and the one or more second passengers through a user interface rendered on a first display device in the first vehicle and a second display device in the identified second vehicle, respectively. An example is shown and described in FIGS. 1, 2, 3A, 3B, and 3C, where the first ECU 302a presents the new seat mapping information 336 to the first set of passengers 308a to 308c and the second ECU 304a presents the received new seat mapping information 336 to the second set of passengers 310a and 310b through a user interface (such as the U Is 228a to 228f) rendered on a first display device (such as the one or more display mediums 122 or 136) in the first bus 302 and a second display device (such as the one or more display mediums 122 or 136) in the identified second bus 304.

At 416, a feedback provided by the one or more first passengers and the one or more second passengers may be received. The ECU 120 may be configured to receive the feedback provided by the one or more first passengers and the one or more second passengers for the presented new seat mapping information. The one or more first passengers and the one or more second passengers may approve or decline the presented new seat mapping information by providing their corresponding feedback. The ECU 120 may further update the new seat mapping information based on the feedback provided by the one or more first passengers and the one or more second passengers. An example is shown and described in FIGS. 1, 2, 3A, 3B, 3C, and 3D, where the first set of passengers 308a to 308c and the second set of passengers 310a and 310b provides the feedback for the presented the new seat mapping information 336 and the new seat mapping information 336, which is updated to the updated new seat mapping information 338.

At 418, a halt instruction may be communicated in an in-vehicle network to stop the first vehicle at a next intermediate transit location that is common to the first vehicle and the identified second vehicle. The ECU 120 may be configured to communicate the halt instruction in the in-vehicle network of the first vehicle to stop the first vehicle at the next intermediate transit location that is common to the first vehicle and the identified second vehicle. The ECU 120 may further instruct the ECU 134 in the identified second vehicle to communicate the similar halt instruction to stop the second vehicle at the next intermediate transit location. An example is shown and described in FIGS. 1, 2, 3A, 3B, and 3C, where the first ECU 302a and the second ECU 304a communicate the halt instruction in the corresponding in-vehicle network (such as the in-vehicle network 226) to stop the first bus 302 and the second bus 304 at the next intermediate transit location (i.e., the intermediate transit location "b").

At 420, the first vehicle and the identified second vehicle may be stopped at the next intermediate transit location based on the halt instruction. A powertrain control system of the first vehicle and the identified second vehicle may be configured to stop the first vehicle and the identified second vehicle at the next intermediate transit location based on the halt instruction. The first vehicle and the identified second vehicle may be stopped to transfer the one or more second passengers or the one or more first passengers into a common vehicle based on the selection of the target vehicle. The common vehicle may correspond to the target vehicle. An example is shown and described in FIGS. 1, 2, 3A, 3B, and 3C, where the powertrain control system (such as the powertrain control system 214) of the first bus 302 and the second bus 304 may stop at the next intermediate transit location (i.e., the intermediate transit location 322). The second set of passengers 310a and 310b are transferred to the first bus 302 (i.e., the selected target vehicle) for sharing travel with the first set of passengers 308a to 308c for the remaining travel route. The control may pass to the end 422.

While the first flow chart 400 has been described with reference to an exemplary scenario, when the first vehicle corresponds to a vehicle that transmits the vehicle sharing request (such as the vehicle sharing request 332), it will be understood by those skilled in the art that in another exemplary scenario (illustrated later in FIGS. 5A and 5B) the first vehicle may correspond to a vehicle that receives the vehicle sharing request 332.

Figure 5A:
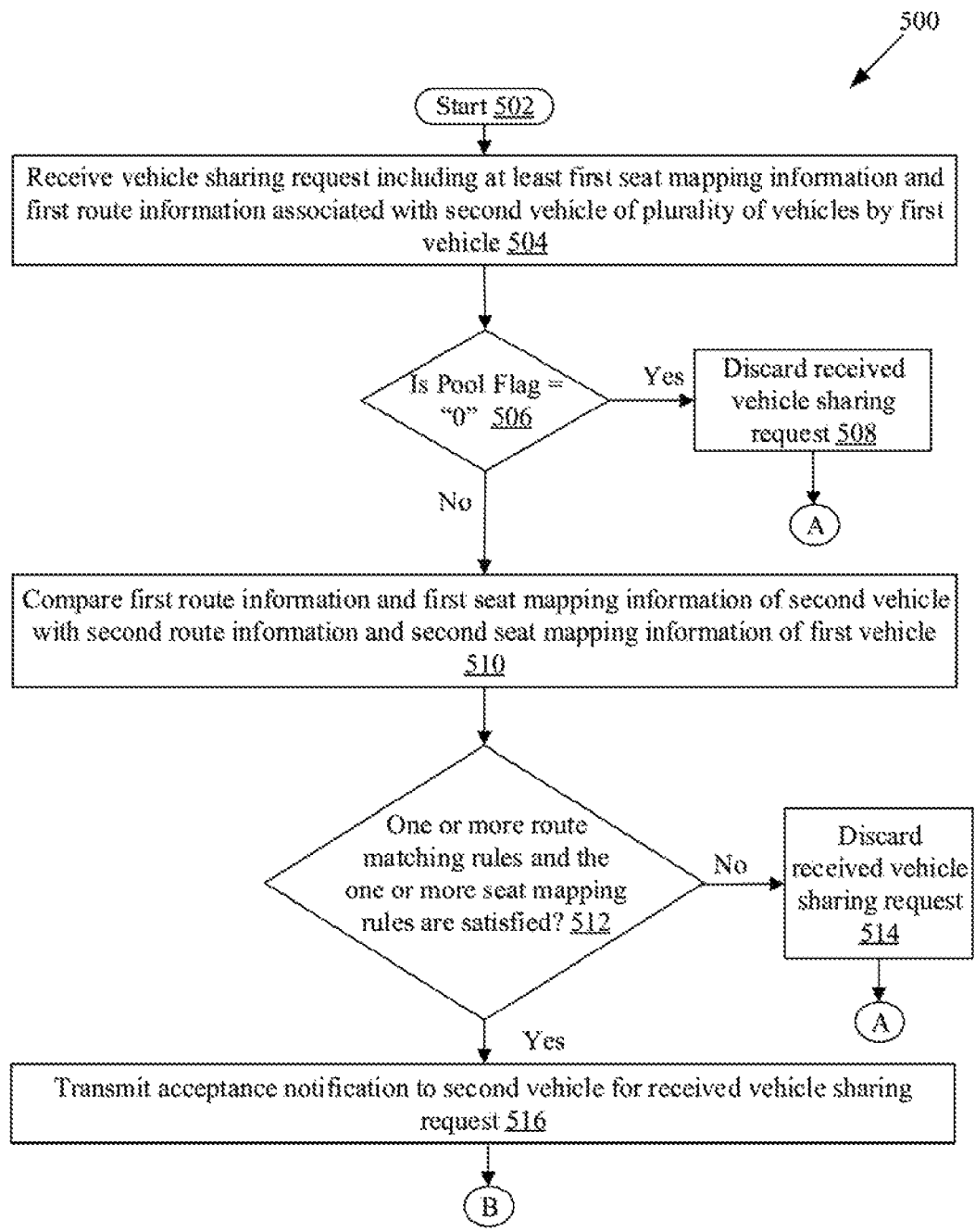
FIGS. 5A and 5B collectively, depict a second flow chart that illustrates exemplary operations for automatic passenger sharing among vehicles, in accordance with an embodiment of the disclosure.
Figure 5B:
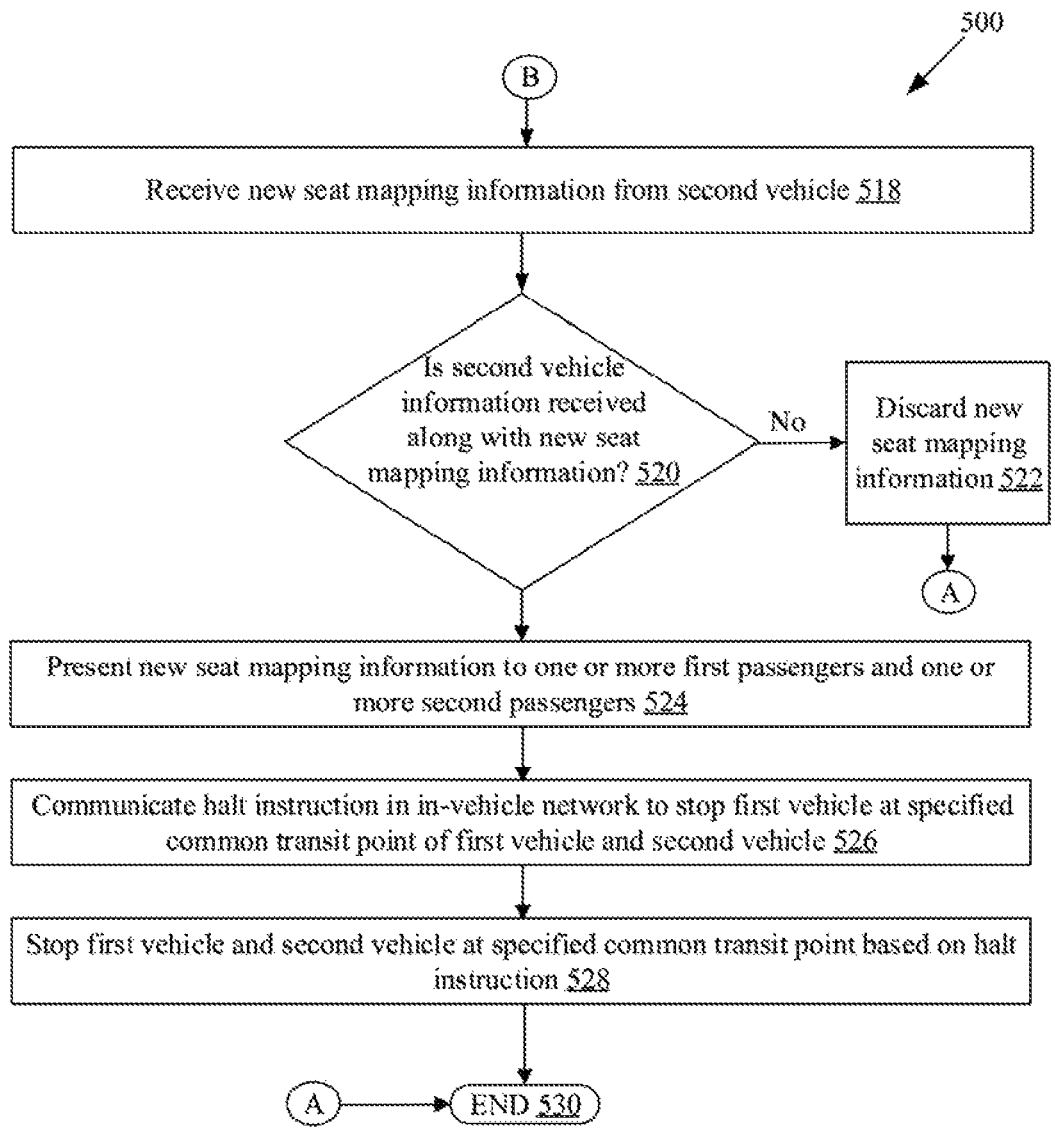

FIGS. 5A and 5B, collectively, depict a second flow chart that illustrates a second exemplary method for facilitating automatic passenger sharing among autonomous vehicles or semi-autonomous vehicles, in accordance with an embodiment of the disclosure. With reference to FIGS. 5A and 5B, there is shown a flowchart 500. The flowchart 500 is described in conjunction with FIGS. 1A, 1B, 1C, 1D, 2, 3A, 3B, 3C, 3D, 3E, 4A, and 4B. The operations, implemented in the ECU 120 for facilitating automatic passenger sharing among autonomous vehicles or semi-autonomous vehicles, begin at 502 and proceed to 504.

At 504, a vehicle sharing request including at least first seat mapping information and first route information associated with a second vehicle of a plurality of vehicles may be received by a first vehicle. The ECU 120 of the first vehicle may be configured to receive the vehicle sharing request from a second vehicle. The vehicle sharing request may include the first seat mapping information, the first route information, and the vehicle information associated with the second vehicle. An example is shown and described in FIGS. 1, 2, 3A, 3B, and 3C, where the second ECU 304a in the second bus 304 (i.e., the first vehicle 102) receives the vehicle sharing request 332 from the first bus 302 (i.e., the second vehicle 106).

At 506, it may be determined by the first vehicle whether the pool flag is set to "1" or "0". The control may pass to 508 based on the pool flag being set to "0". Else, the control may pass to 510. At 508, the received vehicle sharing request may be discarded by the first vehicle. The ECU 120 may be configured to discard the vehicle sharing request based on the pool flag being set to "0". An example is shown and described in FIGS. 1, 2, 3A, 3B, and 3C, where the second ECU 304a in the second bus 304 (i.e., the first vehicle 102) may discard the vehicle sharing request 332 based on the pool flag being set to "0". The control may pass to the end 530.

At 510, the first route information and the first seat mapping information of the second vehicle may be compared with second route information and second seat mapping information of the first vehicle. The ECU 120 may be configured to compare the first route information and the first seat mapping information with the second route information and the second seat mapping information of the first vehicle. An example is shown and described in FIGS. 1, 2, 3A, 3B, 3C, and 3D, where the second ECU 304a in the second bus 304 may compare the first route information and the first seat mapping information of the first bus 302 with the second route information and the second seat mapping information of the second bus 304 (i.e., the first vehicle 102).

At 512, it may be determined by the first vehicle whether the one or more route matching rules and the one or more seat mapping rules are satisfied or not, based on the comparison. The control may pass to 514, based on the one or more route matching rules and the one or more seat mapping rules being unsatisfied (i.e. not satisfied). Else, the control may pass to 516. At 514, the received vehicle sharing request may be discarded by the first vehicle. The ECU 120 may be configured to discard the vehicle sharing request based on the one or more route matching rules and the one or more seat mapping rules being unsatisfied (i.e. not satisfied). The control may pass to the end 530.

At 516, an acceptance notification may be transmitted by the first vehicle to the second vehicle for the received vehicle sharing request. The ECU 120 may be configured to transmit the acceptance notification to the second vehicle for the received vehicle sharing request based on the comparison of the first route information, the first seat mapping information, and first vehicle information with the second route information the second seat mapping information, and the second vehicle information of the first vehicle. An example is shown and described in FIGS. 1, 2, 3A, 3B, 3C, and 3D, where the second ECU 304a in the second bus 304 transmits the acceptance notification 334 to the first bus 302 (i.e., the second vehicle 106) for the vehicle sharing request 332 based on the comparison of the first route information, the first seat mapping information, and the first vehicle information of the first bus 302 with the second route information, the second seat mapping information, and the second vehicle information of the second bus 304 (i.e., the first vehicle 102).

At 518, new seat mapping information may be received by the first vehicle from the second vehicle. The ECU 120 may be configured to receive the new seat mapping information from the second vehicle. The first vehicle information and the second vehicle information may be transmitted along the new seat mapping information. An example, is shown and described in FIGS. 1, 2, 3A, 3B, 3C, and 3D, where the second ECU 304a in the second bus 304 receives new seat mapping information 336 from the first bus 302 (i.e., the second vehicle 106).

At 520, it may be determined by the first vehicle whether the second vehicle information is received along with the new seat mapping information. The ECU 120 may be configured to determine whether the second vehicle information is received along with the new seat mapping information. The control may pass to 522, based on the second vehicle information that is not received along with the new seat mapping information. Else, the control may pass to 524. At 522, the new seat mapping information may be discarded. The ECU 120 may be configured to discard the new seat mapping information when the second vehicle information is not received along with the new seat mapping information. The control may pass to the end 530.

At 524, the new seat mapping information may be presented to the one or more first passengers and the one or more second passengers. The ECU 120 may be configured to present the new seat mapping information to the one or more first passengers and the one or more second passengers through a user interface rendered on a first display device in the first vehicle and a second display device in the identified second vehicle, respectively. An example is shown and described in FIGS. 1, 2, 3A, 3B, and 3C, where the second ECU 304a presents the new seat mapping information 336 to the second set of passengers 310a and 310b and the first ECU 302a presents the new seat mapping information 336 to the a first set of passengers 308a to 308c through a user interface (such as the UIs 228a to 228f) rendered on a first display device (such as the one or more display mediums 122 or 136) in the second bus 304 (i.e., the first vehicle 102) and a second display device (such as the one or more display mediums 122 or 136) in the first bus 302 (i.e., the second vehicle 106).

At 526, a halt instruction may be communicated in an in-vehicle network to stop the first vehicle at a specified common transit point of the first vehicle and the second vehicle. The ECU 120 may be configured to communicate the halt instruction in the in-vehicle network of the first vehicle to stop the first vehicle at the specified common transit point of the first vehicle and the second vehicle. The ECU 120 may further instruct the ECU 134 in the second vehicle to communicate the similar halt instruction to stop the second vehicle at the specified common transit point. The specified common transit point of the first vehicle and the second vehicle may correspond to a next intermediate transit location that is common between a first travel route of the first vehicle and a second travel route of the second vehicle. An example is shown and described in FIGS. 1, 2, 3A, 3B, and 3C, where the second ECU 304a of the second bus 304 and the first ECU 302a of the first bus 302 communicate the halt instruction in the corresponding in-vehicle network to stop the second bus 304 and the first bus 302 at the specified common transit point (i.e., the intermediate transit location "b").

At 528, the first vehicle and the second vehicle may be stopped at the specified common transit point based on the halt instruction. A powertrain control system of the first vehicle and the second vehicle may be configured to stop the first vehicle and the second vehicle at the specified common transit point based on the halt instruction. The first vehicle and the identified second vehicle may be stopped to transfer the one or more second passengers or the one or more first passengers into a common vehicle based on a selected target vehicle. The common vehicle may correspond to the target vehicle. An example is shown and described in FIGS. 1, 2, 3A, 3B, and 3C, where the powertrain control system (such as the powertrain control system 214) of the second bus 304 (i.e., the first vehicle 102) and the first bus 302 (i.e., the second vehicle 106) may stop at the specified common transit point (i.e., the intermediate transit location "b"). The second set of passengers 310a and 310b are transferred to the first bus 302 (i.e., the selected target vehicle) for sharing travel with the first set of passengers 308a to 308c for the remaining travel route. The control may pass to the end 530.

In accordance with an embodiment of the disclosure, a system for sharing passengers among a plurality of vehicles, such as the first vehicle 102 and the second vehicle 106, is disclosed. The system (such as the ECU 120 (FIG. 1)) may comprise one or more circuits (hereinafter referred to as the microprocessor 202 (FIG. 2)). The microprocessor 202 may be configured to communicate a vehicle sharing request (such as the vehicle sharing request 332 (FIG. 3B)) including at least first seat mapping information and first route information associated with the first vehicle 102 to at least one remaining vehicle of the plurality of vehicles. The microprocessor 202 may be configured to identify a second vehicle (such as the second vehicle 106 (FIG. 1)) among the at least one remaining vehicle of the plurality of vehicles for sharing passengers based on a comparison of the first route information and the first seat mapping information with second route information and second seat mapping information received from the at least one remaining vehicle of the plurality of vehicles. The microprocessor 202 may be configured to select a target vehicle from the identified second vehicle 106 or the first vehicle 102 to allow one or more first passengers (such as the one or more first passengers 132a to 132c (FIG. 1)) of the first vehicle 102 and one or more second passengers (such as the one or more second passengers 146a to 146b (FIG. 1)) of the identified second vehicle 106 to share travel in the selected target vehicle.

In accordance with another embodiment of the disclosure, a system for sharing passengers among a plurality of vehicles, such as the first vehicle 102 and the second vehicle 106, is disclosed. The system (such as the ECU 120 (FIG. 1)) may comprise one or more circuits (hereinafter referred to as the microprocessor 202 (FIG. 2)). The microprocessor 202 may be configured to receive a vehicle sharing request (such as the vehicle sharing request 332 (FIG. 3B)) including at least first seat mapping information and first route information associated with a second vehicle (such as the second vehicle 106) of the plurality of vehicles from the second vehicle 106. The microprocessor 202 may be configured to transmit an acceptance notification (such as the acceptance notification 334 (FIG. 3C)) for the received vehicle sharing request 332 to the second vehicle 106 based on at least a comparison of the first route information and the first seat mapping information of the second vehicle 106 with second route information and second seat mapping information of the first vehicle 102. The microprocessor 202 may be configured to communicate a halt instruction in an in-vehicle network to stop the first vehicle 102 at a specified common transit point of the first vehicle 102 and the second vehicle 106 to include one or more first passengers (such as the one or more first passengers 132a to 132c (FIG. 1)) of the first vehicle 102 and one or more second passengers (such as the one or more second passengers 146a to 146b (FIG. 1)) of the second vehicle 106 to share travel in a target vehicle. The target vehicle may be selected from the first vehicle 102 or the second vehicle 106.

The ECU 120 of the first vehicle 102 manages to retrieve various types of information related to the first vehicle 102 for communicating a vehicle sharing request. Thus, based on the current information related to the first vehicle 102 the vehicle sharing request may be automatically initiated by the ECU 120. The vehicle sharing request is meant for sharing passengers among a plurality of vehicles. For instance, "3 passengers" may be traveling in a first vehicle with capacity "10 passengers" and "4 passengers" may be traveling in a second vehicle of capacity "10" passengers along same route. In such a case, the "3 passengers" of the first vehicle may be transferred to the second vehicle. Such sharing of passengers among the plurality of vehicles reduces the congestion along roads and further helps in a better utilization of resources, for example, fuel and transport vehicles.

However, in conventional systems, such sharing of passengers may only be initiated before the departure of the plurality of vehicles. The ECU 120 enables the first vehicle 102 to share passengers with remaining vehicles in the plurality of vehicles in real-time. The ECU 120 utilizes V2V communication to communicate with the remaining vehicles for automatic identification of potential vehicles to share passengers. In a scenario, when the potential vehicles go out of range the ECU 120 may utilize V2C communication to provide uninterrupted communication between the vehicles to initiate passenger sharing. Thus, the sharing of passengers among the plurality of vehicles may be independent of any human intervention. The ECU 120 further takes into consideration various seat mapping rules and route matching rules in order to ensure a proper passenger sharing. The disclosed system and method further targets the ever increasing problem of pollution by reducing the number of vehicles that are travelling along the same route based on passenger sharing among the vehicles. The disclosed system and method is beneficial for both service provider of transportation services and travelling passengers. For service providers, the better resource utilization may improve revenue generation and for passengers, the cost of travelling may reduce due to sharing the same vehicle with more number of passengers that are transferred from other vehicles. The ECU 120 improves the operating speed and accuracy of itself and the vehicle in which it is installed to provide a capability of identifying a vehicle from tens, hundreds, or thousands of near-by vehicles for sharing passengers. As the ECU 120 is configured to continuously or periodically analyze route information and the seat mapping information, received via V2V or V2X communication from near-by vehicles, a solution for vehicle sharing using V2X is provided by real time automatic matching of such real-time generated/provisioned information. Typically, a conventional vehicle or car sharing services performs the matching process using pre-registered user information, such as destination before using the vehicle sharing service. Real time or near-real time generated seat mapping information is not used for vehicle sharing service. Further, in conventional systems once a passenger boards a vehicle, further optimization or vehicle sharing may not be possible as information about passengers, and seat mapping information is not updated. Additionally, as the travelling route of a vehicle is retrieved from a navigation unit by the ECU 120, the vehicle sharing process is accurate and capable of suitably and automatically responding to changes in travel routes.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for sharing passengers among a plurality of vehicles. The at least one code section may cause the machine and/or computer to perform the steps that comprise communication of a vehicle sharing request including at least first seat mapping information and first route information associated with the first vehicle to at least one remaining vehicle of the plurality of vehicles. A second vehicle among the at least one remaining vehicle of the plurality of vehicles may be identified for sharing passengers based on a comparison of the first route information and the first seat mapping information with second route information and second seat mapping information received from the at least one remaining vehicle of the plurality of vehicles. A target vehicle may be selected from the identified second vehicle or the first vehicle to allow one or more first passengers of the first vehicle and one or more second passengers of the identified second vehicle to share travel in the selected target vehicle.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for sharing passengers among a plurality of vehicles. The at least one code section may cause the machine and/or computer to perform the steps that comprise receiving a vehicle sharing request including at least first seat mapping information and first route information associated with a second vehicle of the plurality of vehicles from the second vehicle. An acceptance notification for the received vehicle sharing request may be transmitted to the second vehicle based on at least a comparison of the first route information and the first seat mapping information of the second vehicle with second route information and second seat mapping information of the first vehicle. A halt instruction may be communicated in an in-vehicle network to stop the first vehicle at a specified common transit point of the first vehicle and the second vehicle to include one or more first passengers of the first vehicle and one or more second passengers of the second vehicle to share travel in a target vehicle. The target vehicle may be selected from the first vehicle or the second vehicle.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system, comprising:
   at least one circuit in an electronic control unit (ECU) for a first vehicle of a plurality of vehicles, wherein said at least one circuit is configured to:
   communicate a vehicle sharing request, including at least first seat mapping information and first route information associated with said first vehicle, to at least one second vehicle of said plurality of vehicles;

receive second seat mapping information and second route information from said at least one second vehicle of said plurality of vehicles based on said vehicle sharing request, wherein said second seat mapping information and said second route information are associated with said at least one second vehicle of said plurality of vehicles;

identify a third vehicle from said plurality of vehicles based on a comparison of said first route information and said first seat mapping information with said second route information and said second seat mapping information;

select, as a target vehicle, one of said identified third vehicle or said first vehicle to allow at least one first passenger of said first vehicle and at least one second passenger of said identified third vehicle to share travel in said selected target vehicle; and communicate, based on said selection of said target vehicle, a halt instruction via an in-vehicle network to stop at least one of said identified third vehicle or said first vehicle, wherein said stop of said at least one of said identified third vehicle or said first vehicle is at an intermediate transit location common to said identified third vehicle and said first vehicle.

2. The system according to claim 1, wherein
said at least one circuit is further configured to communicate said vehicle sharing request from said first vehicle to said at least one second vehicle of said plurality of vehicles via a vehicle-to-X (V2X) communication, and
said V2X communication comprises at least one of a vehicle-to-vehicle (V2V) communication, a vehicle-to-cloud (V2C) communication, a vehicle-to-infrastructure (V2I) communication, or a vehicle-to-device (V2D) communication.

3. The system according to claim 1, wherein said vehicle sharing request further includes vehicle information of said first vehicle.

4. The system according to claim 3, wherein said vehicle information of said first vehicle corresponds to at least one of a vehicle identification number of said first vehicle, a vehicle type of said first vehicle, or details of window seats in said first vehicle.

5. The system according to claim 1, wherein said at least one circuit is further configured to determine said first seat mapping information of said first vehicle based on at least one image captured by at least one imaging device of said first vehicle.

6. The system according to claim 1, wherein said first seat mapping information of said first vehicle corresponds to a count of vacant seats, a count of occupied seats, a count of said at least one first passenger, seat booking details, and demographic details of said at least one first passenger in said first vehicle.

7. The system according to claim 1, wherein
said first route information of said first vehicle corresponds to a first travel route of said first vehicle, and
said first travel route comprises a source location, a first destination location, and said intermediate transit location.

8. The system according to claim 7, wherein a second destination location of said identified third vehicle is same as said first destination location of said first vehicle.

9. The system according to claim 7, wherein a second travel route of said identified third vehicle corresponds to at least a portion of said first travel route of said first vehicle.

10. The system according to claim 7, wherein said first travel route of said first vehicle corresponds to at least a portion of a second travel route of said identified third vehicle.

11. The system according to claim 1, wherein said at least one circuit is further configured to compare, based on at least one seat mapping rule, said first seat mapping information with said second seat mapping information received from said at least one second vehicle of said plurality of vehicles.

12. The system according to claim 1, wherein said at least one circuit is further configured to compare, based on at least one route matching rule, said first route information with said second route information received from said at least one second vehicle of said plurality of vehicles.

13. The system according to claim 1, wherein
said selection of said target vehicle is based on at least one selection parameter, and
said at least one selection parameter comprises at least a travel route parameter.

14. The system according to claim 1, wherein
said at least one circuit is further configured to communicate said halt instruction via said in-vehicle network to stop said first vehicle,
said stop of said first vehicle is at said intermediate transit location,
said stop of said first vehicle is for transfer of said at least one first passenger of said first vehicle into said identified third vehicle for said share of said travel, and
said communication of said halt instruction is based on said selection of said identified third vehicle as said target vehicle.

15. The system according to claim 1, wherein
said at least one circuit is further configured to communicate said halt instruction via said in-vehicle network to stop said first vehicle,
said stop of said first vehicle is at said intermediate transit location,
said stop of said first vehicle is for transfer of said at least one second passenger of said identified third vehicle into said first vehicle for said share of said travel, and
said communication of said halt instruction is based on said selection of said first vehicle as said target vehicle.

16. The system according to claim 1, wherein
said at least one circuit is further configured to generate new seat mapping information to include said at least one first passenger of said first vehicle and said at least one second passenger of said identified third vehicle into a common vehicle to share said travel, and
said common vehicle corresponds to said selected target vehicle.

17. The system according to claim 16, wherein
said at least one circuit is further configured to receive a feedback from said at least one first passenger and said at least one second passenger, and
said generation of said new seat mapping information is further based on said received feedback.

18. The system according to claim 16, wherein said at least one first passenger and said at least one second passenger are seated in said selected target vehicle based on said new seat mapping information.

19. The system according to claim 16, wherein said at least one circuit is further configured to present said generated new seat mapping information to said at least one first passenger and said at least one second passenger via a user interface rendered on a first display device in said first vehicle and a second display device in said identified third vehicle, respectively.

20. The system according to claim 1, wherein said at least one circuit is further configured to receive an acceptance notification for said communicated vehicle sharing request from said identified third vehicle.

21. The system according to claim 1, wherein said at least one circuit is further configured to communicate with said identified third vehicle via a vehicle-to-cloud (V2C) communication, based on an association of said first vehicle and said identified third vehicle with a common travel group.

22. A system comprising:
at least one circuit in an electronic control unit (ECU) for a first vehicle of a plurality of vehicles, wherein said at least one circuit is configured to:
receive a vehicle sharing request, including at least first seat mapping information and first route information associated with a second vehicle of said plurality of vehicles, from said second vehicle;
transmit an acceptance notification for said received vehicle sharing request to said second vehicle, based on at least a comparison of said first route information and said first seat mapping information of said second vehicle with second route information and second seat mapping information of said first vehicle;
select, as a target vehicle, one of said first vehicle or said second vehicle; and
communicate a halt instruction via an in-vehicle network, wherein
said halt instruction is communicated to stop said first vehicle at a specified common transit point of said first vehicle and said second vehicle to include at least one first passenger of said first vehicle and at least one second passenger of said second vehicle to share travel in said selected target vehicle.

23. The system according to claim 22, wherein
said at least one circuit is further configured to receive said vehicle sharing request from said second vehicle via a vehicle-to-X (V2X) communication, and
said V2X communication comprises at least one of a vehicle-to-vehicle (V2V) communication, a vehicle-to-cloud (V2C) communication, a vehicle-to-infrastructure (V2I) communication, or a vehicle-to-device (V2D) communication.

24. The system according to claim 22, wherein said vehicle sharing request further includes vehicle information of said second vehicle.

25. The system according to claim 22, wherein said specified common transit point of said first vehicle and said second vehicle corresponds to a next intermediate transit location that is common between a first travel route of said first vehicle and a second travel route of said second vehicle.

26. A method comprising:
communicating, by an electronic control unit (ECU) of a first vehicle of a plurality of vehicles, a vehicle sharing request including at least first seat mapping information and first route information associated with said first vehicle to at least one second vehicle of said plurality of vehicles;
receiving, by said ECU, second seat mapping information and second route information from said at least one second vehicle of said plurality of vehicles based on said vehicle sharing request, wherein said second seat mapping information and said second route information are associated with said at least one second vehicle of said plurality of vehicles;
identifying, by said ECU, a third vehicle from said plurality of vehicles based on at least a comparison of said first route information and said first seat mapping information with said second route information and said second seat mapping information;
selecting, as a target vehicle, by said ECU, one of said identified third vehicle or said first vehicle to allow at least one first passenger of said first vehicle and at least one second passenger of said identified third vehicle to share travel in said selected target vehicle; and
communicating, by said ECU, based on said selection of said target vehicle, a halt instruction via an in-vehicle network to stop at least one of said identified third vehicle or said first vehicle,
wherein said stop of said at least one of said identified third vehicle or said first vehicle is at an intermediate transit location common to said identified third vehicle and said first vehicle.

* * * * *